US008786488B2

(12) United States Patent  
Gravelle et al.

(10) Patent No.: US 8,786,488 B2  
(45) Date of Patent: Jul. 22, 2014

(54) SYSTEM AND METHOD FOR MICROWAVE RANGING TO A TARGET IN PRESENCE OF CLUTTER AND MULTI-PATH EFFECTS

(75) Inventors: Kelly Gravelle, Poway, CA (US); Jeremy Landt, Santa Fe, NM (US); Patrick W. Lunsford, Rio Rancho, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 418 days.

(21) Appl. No.: 13/163,005

(22) Filed: Jun. 17, 2011

(65) Prior Publication Data

US 2011/0309969 A1 Dec. 22, 2011

Related U.S. Application Data

(63) Continuation-in-part of application No. 13/095,296, filed on Apr. 27, 2011.

(60) Provisional application No. 61/355,824, filed on Jun. 17, 2010.

(51) Int. Cl.
*G01S 13/32* (2006.01)
*G01S 13/76* (2006.01)
*G01S 13/75* (2006.01)
*G01S 7/02* (2006.01)

(52) U.S. Cl.
CPC ............ *G01S 13/765* (2013.01); *G01S 13/751* (2013.01); *G01S 7/023* (2013.01)
USPC ............................ 342/42; 342/130; 340/10.1

(58) Field of Classification Search
CPC .......................................... G01S 13/75–13/767
USPC ............................................................. 342/42
See application file for complete search history.

(56) References Cited

U.S. PATENT DOCUMENTS

| 6,476,756 | B2 | 11/2002 | Landt |
| 6,600,443 | B2 | 7/2003 | Landt |
| 7,864,045 | B2* | 1/2011 | Karr ........................ 340/539.13 |
| 2013/0038428 | A1* | 2/2013 | Viikari et al. ................ 340/10.4 |

* cited by examiner

*Primary Examiner* — Matthew M Barker  
(74) *Attorney, Agent, or Firm* — Caesar, Rivise, Bernstein, Cohen & Pokotilow, Ltd.

(57) ABSTRACT

A system for measuring the range to an RFID tag including situations containing high clutter and multi-path signals is disclosed. The system includes an RFID reader; an RFID tag; and a coordinated pulse compression radar system. In the system the RFID reader causes the tag to respond to received signals in a first backscatter state at a first time and a second backscatter state at a second time. The pulse compression radar system transmits short pulses coordinated by the backscatter state of the RFID tag and the system creates a differential signal comprised of the differences between radar signals obtained during the first and second states of the tag to obtain an uncorrupted measure of a round trip time of flight of said radar pulses between the pulse radar system and the RFID tag.

8 Claims, 25 Drawing Sheets

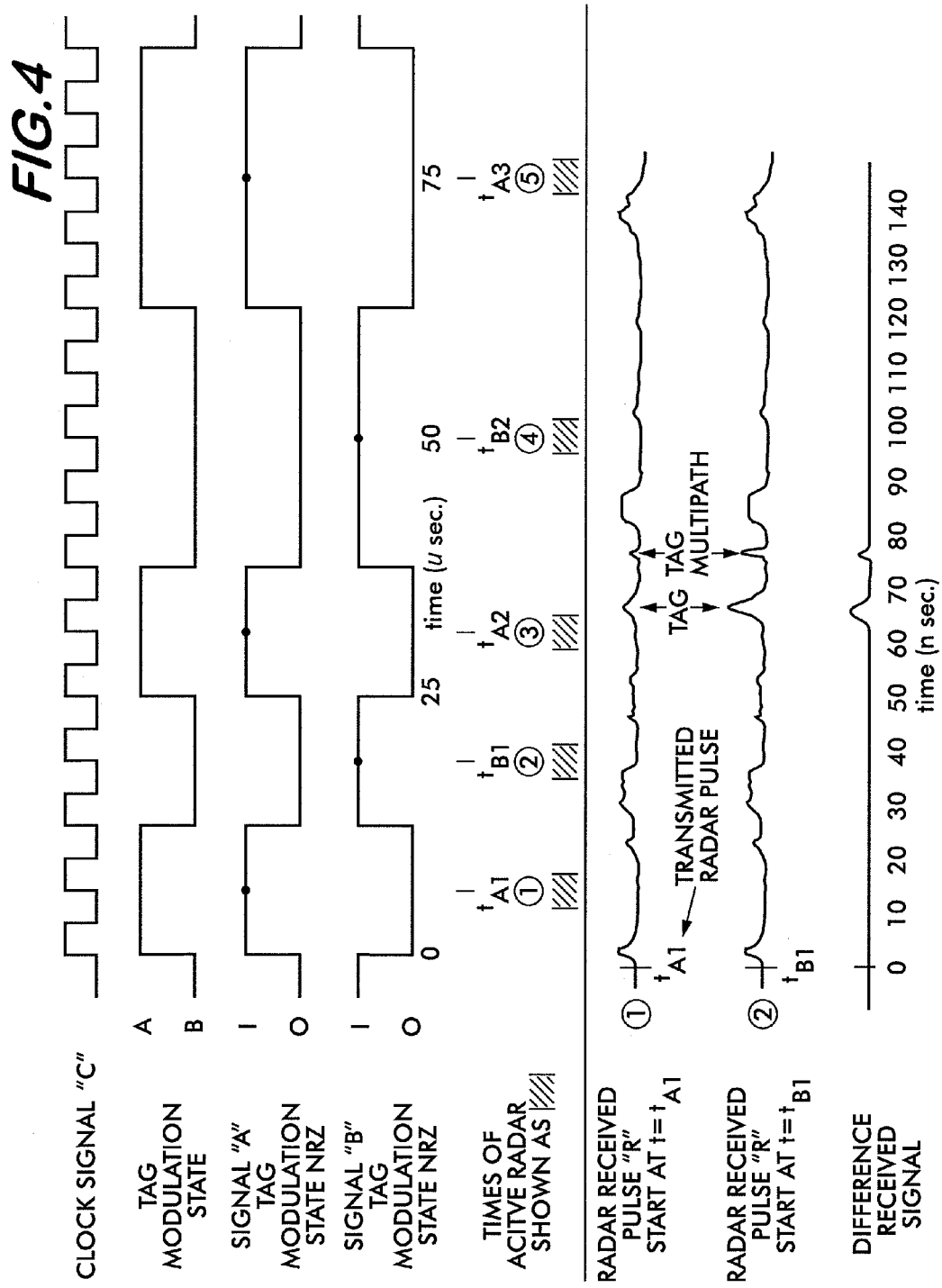

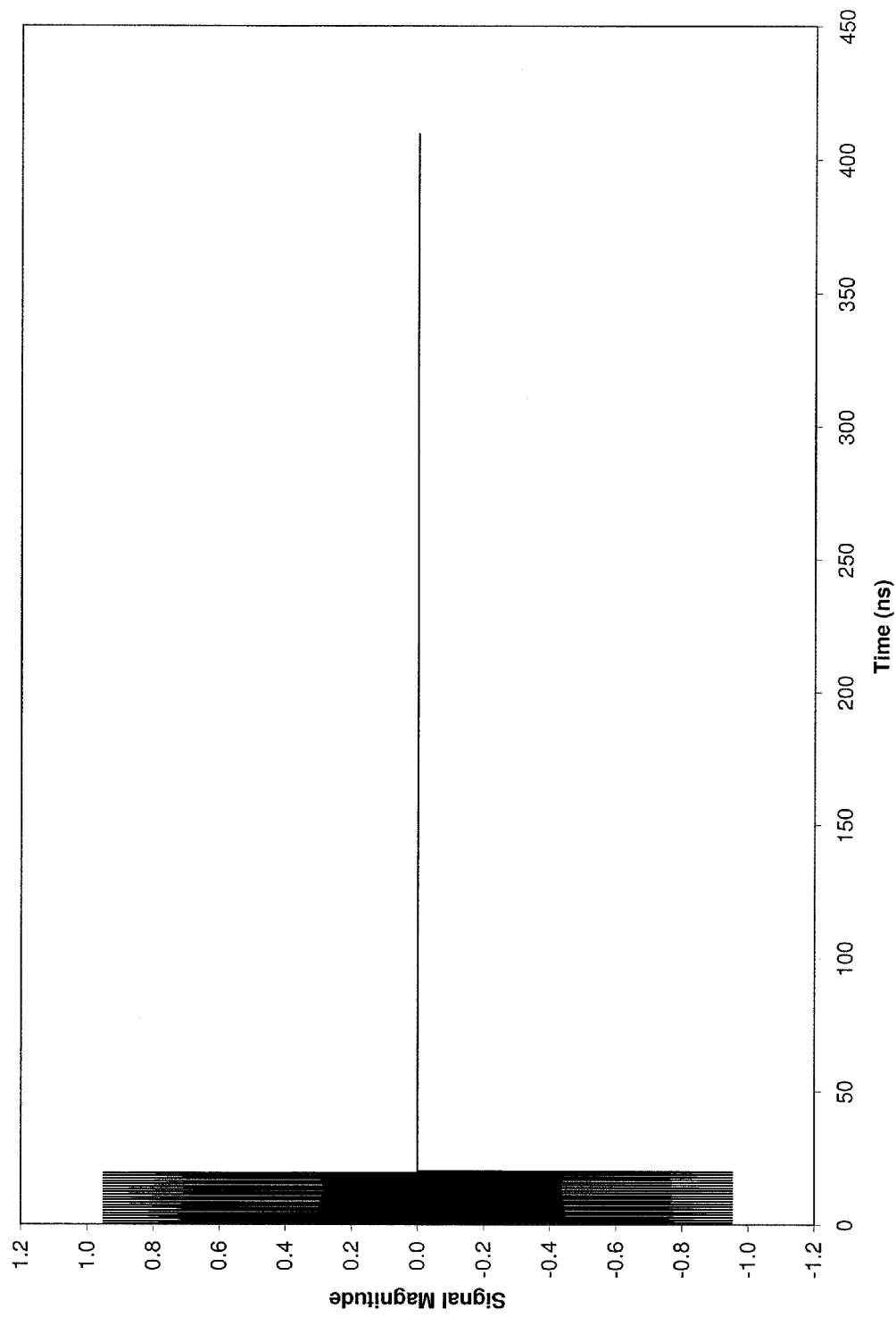

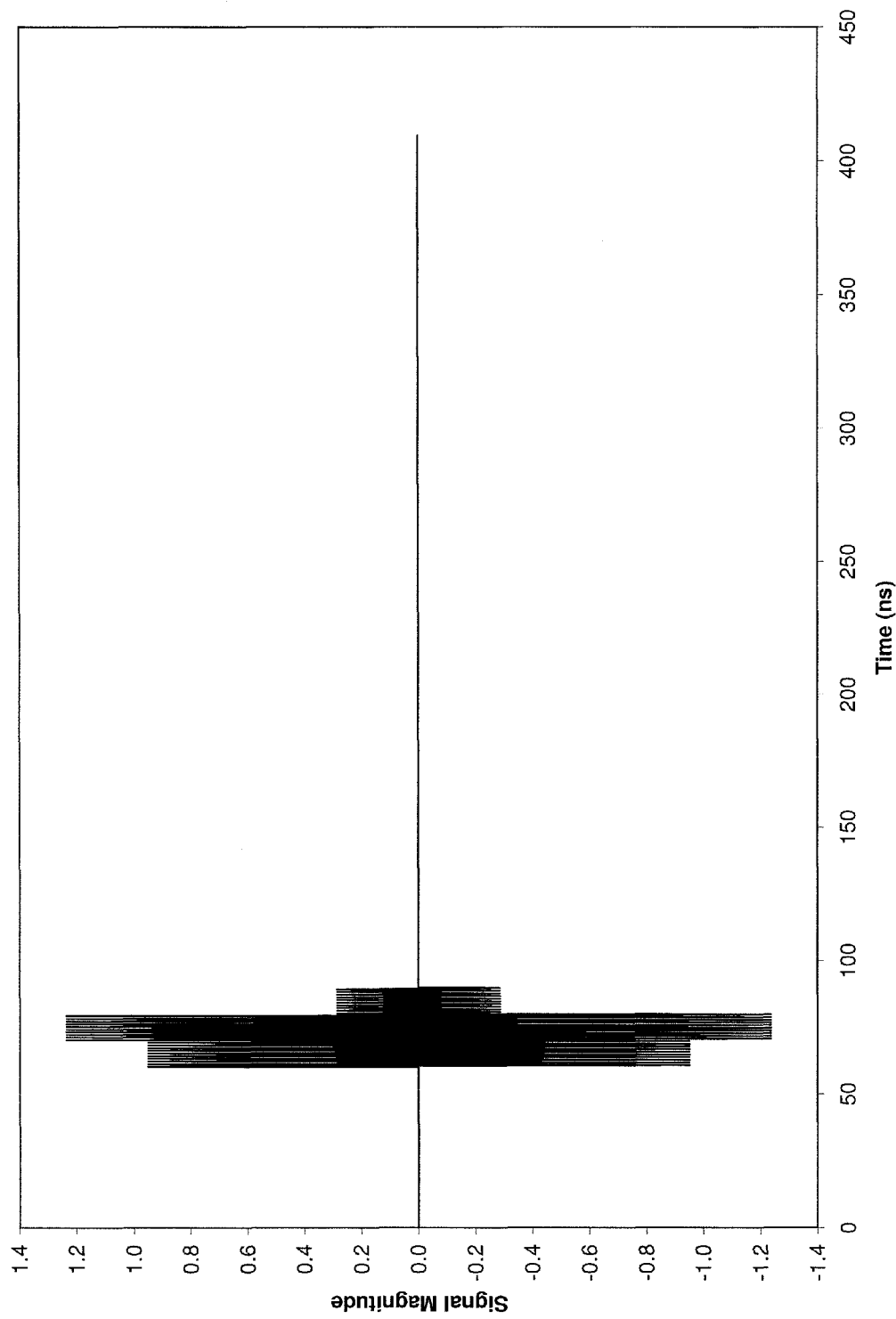

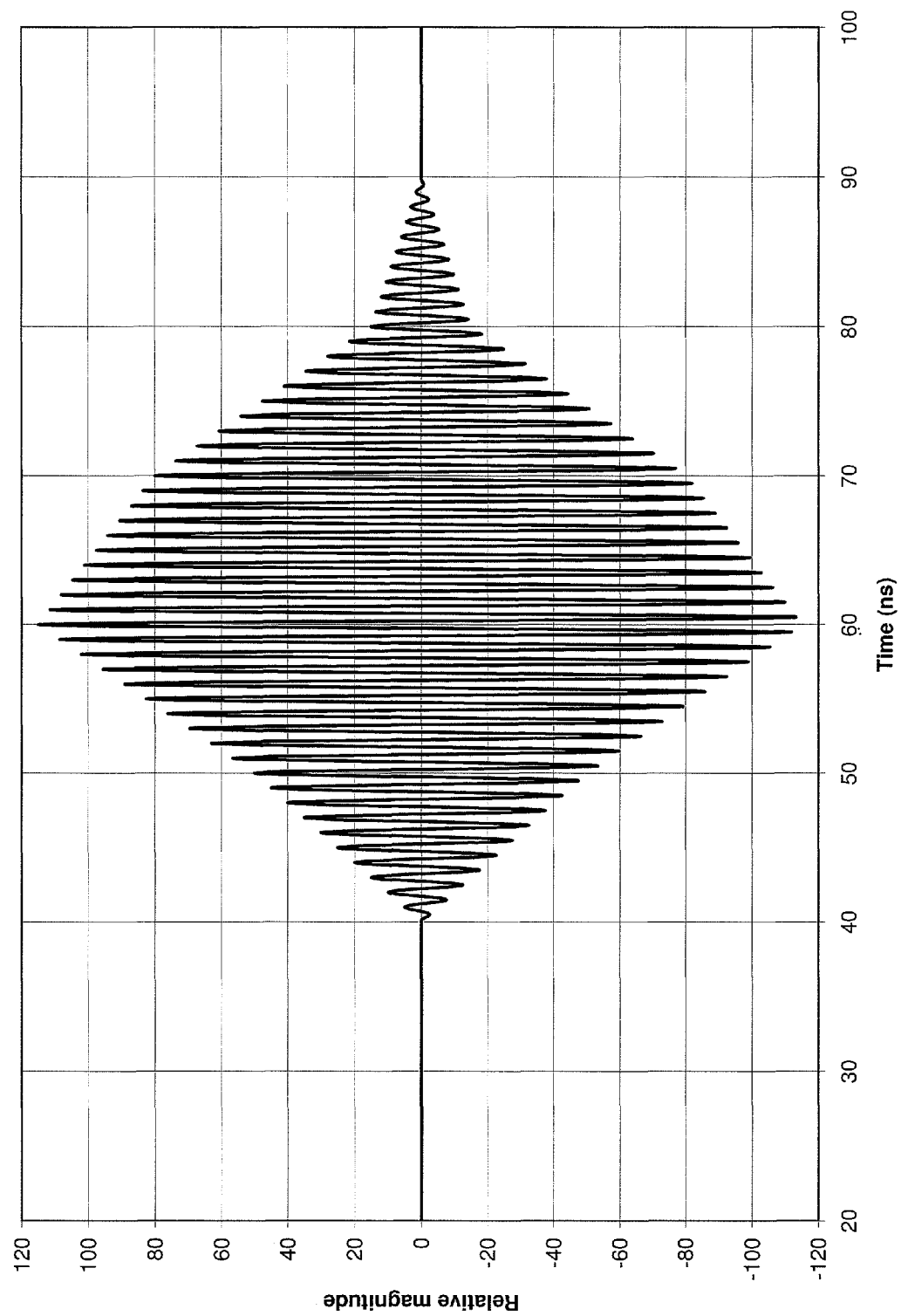

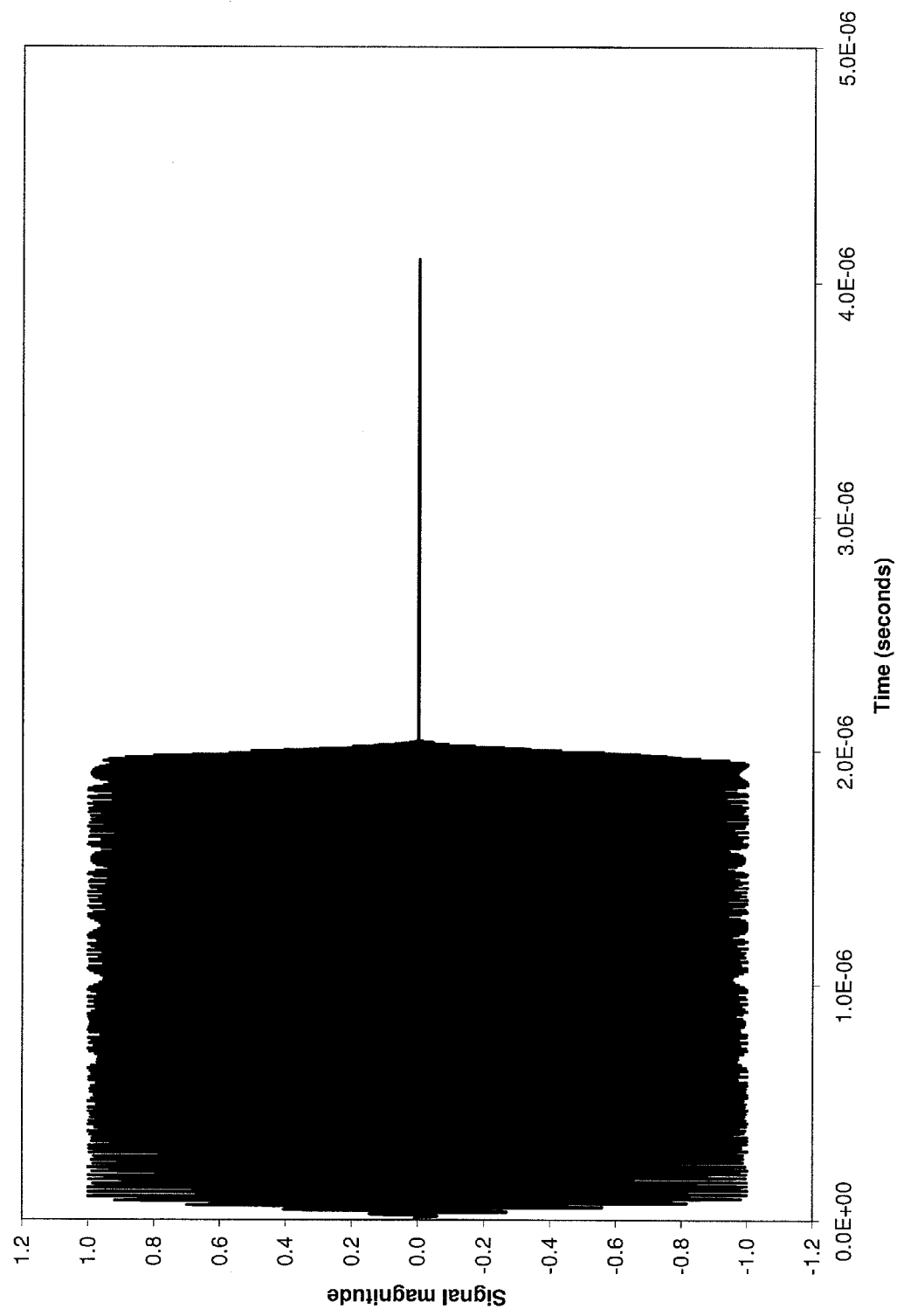

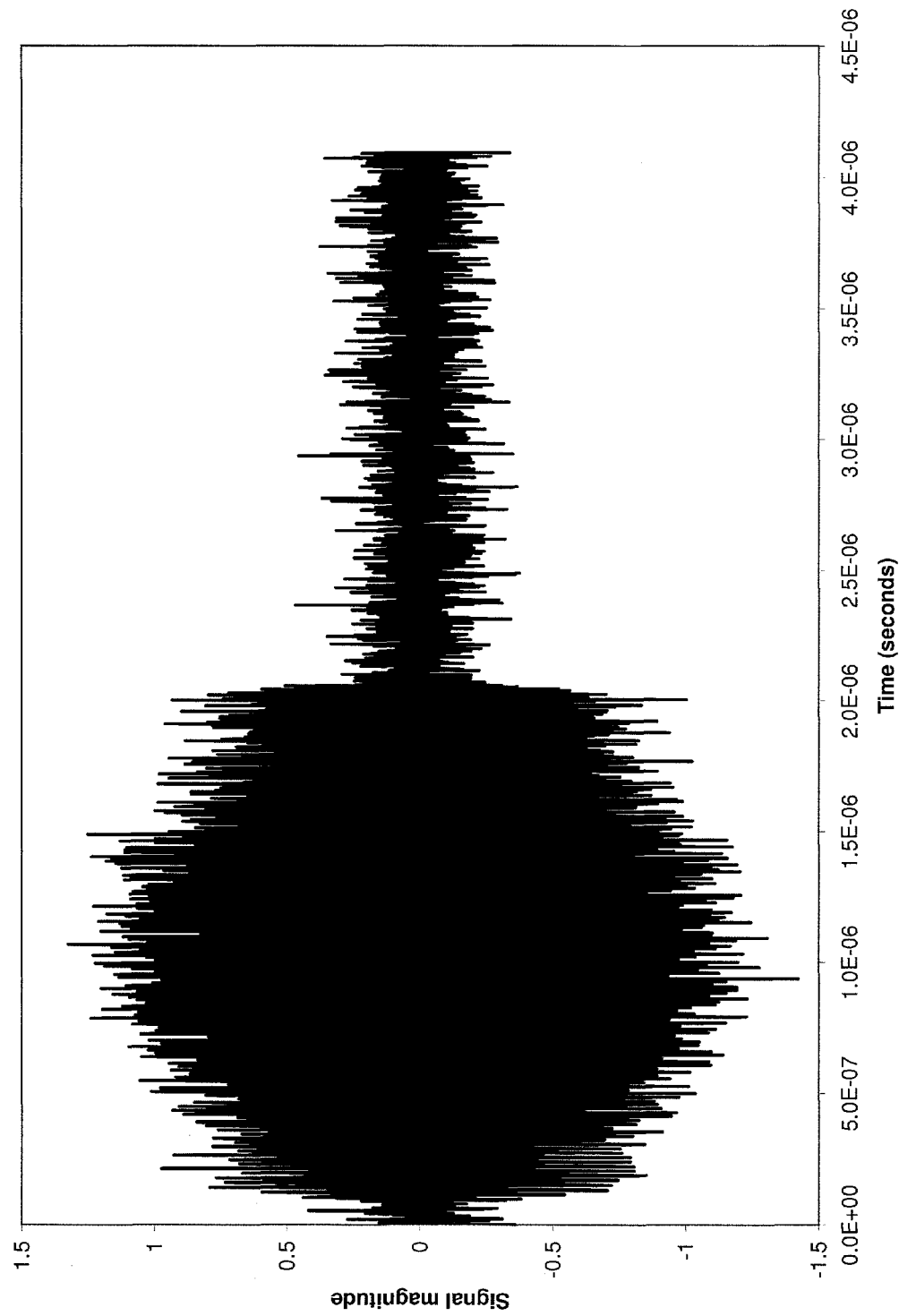

SYSTEM AND METHOD FOR MICROWAVE RANGING TO A TARGET IN PRESENCE OF CLUTTER AND MULTI-PATH EFFECTS

CROSS-REFERENCE TO RELATED APPLICATIONS

This utility application claims the benefit under 35 U.S.C. §119(e) of Provisional Application Ser. No. 61/355,824, filed on Jun. 17, 2010, entitled System and Method for Microwave Ranging to a Target in Presence of Clutter and Multi-path Effects, and also claims benefit under 35 U.S.C. §120 as a continuation-in-part of Utility application Ser. No. 13/095,296 filed on Apr. 27, 2011, also entitled System and Method for Microwave Ranging to a Target in Presence of Clutter and Multi-path Effects. The entire disclosures of these applications are incorporated by reference herein.

FIELD OF INVENTION

This invention relates to the field of electromagnetic distance measurement and, in particular, distance measurement to an RFID device.

BACKGROUND OF THE INVENTION

A radar system may measure the distance to a target through measurement of the round-trip time-of-flight of the radar signal to a target and return. The one-way distance, d, to a target is computed from the equation $2d=ct$ where c is the velocity of light and where t is the time between transmitted signals and received signals reflected from a target. Radar technology is well developed. However, an individual target may be difficult to isolate if there are many reflectors in the field of the radar system. Also, the distance calculation may be corrupted by multipath effects and limited bandwidth of the transmitted pulse. Multipath effects may be mitigated by using the time of the first return signal from a target. However, this technique is fraught with problems if the reflected signal from the desired target is hidden by signals reflected from other objects in the field of the radar system.

RFID systems are well known in the art and are used to monitor objects and places by attaching tags to objects and places to be monitored. These objects may be large and in the presence of many other reflecting objects. RF signals from a tag may be hidden by noise and larger signals reflected from other reflecting objects. Backscatter RFID readers transmit CW signals while acquiring data from tags, and thus lack the capability of ranging using measurement of time-of-flight methods. RFID tags used in modulated backscatter RFID systems are often referred to as 'passive' (without an internal source of power) or 'semi-passive' (with an internal source of power) since modulated backscatter tags do not generate radio signals and only reflect radio signals. RFID tags may also send data to a RFID reader by generating and sending radio signals. These types of RFID tags are often referred to as 'active' tags since they generate radio signals and contain an internal source of power. The phase of the backscattered signals from a modulated backscatter tag can be used to calculate the distance to a tag in the presence of other reflecting objects, as disclosed in U.S. patent application Ser. No. 12/840,587, titled SYSTEM AND METHOD FOR MEASUREMENT OF DISTANCE TO A TAG BY A MODULATED BACKSCATTER RFID READER, but accuracy may be degraded in a highly reflecting environment due to multipath effects. Many types of RFID systems use modulation signals with frequencies on the order of a megahertz or less and often shape waveforms to comply with radio regulations. These modulation waveforms lack nanosecond precision needed to use time-of-flight methods to measure distance to a resolution on the order of a meter or less between tags and readers.

RFID systems using time-of-flight methods to determine object location may be found in the art but these types of systems are expensive, require careful installation, use expensive tags and require precise positioning of the system components. Signal strength methods to determine tag location may also be found in the art, but these types of systems lack accuracy and precision.

Many tens of millions of RFID tags are presently in use and installations would benefit if the distance to these tags could be measured accurately in a complex radio environment.

Modulated Backscatter RFID System of the Prior Art

A modulated backscatter RFID tag transfers data from its memory to a remote reader by modulating the backscatter cross section of the tag antenna in a coded fashion, changing at a minimum from one reflecting state to another reflecting state (or between several reflecting states) in a time-wise fashion, thus coding the tag data on the time-varying backscatter cross section of the tag. A continuous wave (CW) radio signal is transmitted toward a tag by a reader. The tag modulates the reflected signal sent back to the reader thus producing a time-varying signal encoded with data from the tag. The reader then receives and decodes the modulated signal from the tag to extract the information sent by the tag. The decoding process recovers the timing of the changes in modulation states of the tag. These timings cannot be used for time-of-flight calculations since there is no absolute time reference to establish a time base for calculation. Another practical problem is that the transitions from one modulation state to the other lack the bandwidth, precision and definition in timing required for nanosecond resolution required for ranging. For example, a resolution of 1 meter in tag location requires a timing resolution of 7 nanoseconds or better. Typical RFID systems such as specified by ISO/IEC 18000-6: 2004(E) and ISO/IEC 18000-6:2004/FDAM 1:2006(E) require timings, such as rise and fall times, on the order of microseconds and are thus over 1000 times to slow. The reader also decodes the states of modulation as a function of time. The reader uses these states to recover the bit pattern, and thus data, sent by the tag.

Pulse Radar System of the Prior Art

An example of the geometry of a conventional radar system is shown in FIG. 1. The radar system transmits a RF signal which is reflected from the objects in the field of the radar and are received by the radar system. Strong multipath signals may occur from a radio path bounced from the radar system to a flat surface (ground for example), to targets, and return. A sample plot of signals is shown in FIG. 2. To measure the distance to a single desired target, the correct return signal of the many in FIG. 2 is required.

All references cited herein are incorporated herein by reference in their entireties.

BRIEF SUMMARY OF THE INVENTION

Objects of the invention include:
Measuring distance to RFID tags that are already in use
Measuring distance to a RFID tag with an accuracy of 1 meter or better
Measuring distance to a RFID tag in the presence of multipath effects
Measuring distance to a RFID tag within a cluttered RF environment Measuring distance to a RFID tag in close proximity to other reflecting objects Reducing bandwidth requirements of signals transmitted to measure distance to a RFID tag while improving accuracy Improving signal to noise ratio to enhance measurement accuracy of distance to a tag while reducing bandwidth and transmit RF power Reducing or eliminating the effects of self-jamming by the signal transmitted by a reader to read a tag while simultaneously determining the distance to a tag Enabling a wide dynamic range to resolve weak signals in the presence of noise, interference and other strong RF signals Measuring distance to a moving RFID tag avoiding averaging signals for long periods of time Shortening the minimum range distance due to self jamming of the transmit radar signal Measuring distance to a RFID tag while simultaneously in data communication with the tag The present invention achieves the stated objectives as well as others while overcoming difficulties of the prior art. The techniques of the present invention can be applied to other radar systems using the principles described below.

In an embodiment of the invention, there is a system for measuring the range to an RFID tag including situations containing high clutter and multi-path signals, is disclosed. The system includes an RFID reader; an RFID tag; and a coordinated pulse radar system. In the system, the RFID reader causes the tag to respond to received signals in a first backscatter state at a first time and a second backscatter state at a second time. The pulsed radar system transmits short pulses coordinated by the backscatter state of the RFID tag and the system creates a differential signal comprised of the differences between radar signals obtained during the first and second states of the tag to obtain an uncorrupted measure of a round trip time of flight of the radar pulses between the pulse radar system and the RFID tag.

BRIEF DESCRIPTION OF SEVERAL VIEWS OF THE DRAWINGS

FIG. 4 shows signals of the system of FIG. 3.

FIG. 5a is a graph of a transmit radar signal.

FIG. 5d is a graph of a of a return radar signal from the single source of clutter and a tag that is reflecting.

FIG. 5e is a graph of a correlation of the transmit radar signal with the return radar signal of FIG. 5d.

FIG. 6a is a graph of a transmit radar signal.

FIG. 6d is a graph of a return radar signal from two sources of clutter and a tag that is reflecting.

DETAILED DESCRIPTION OF PREFERRED EMBODIMENTS OF THE INVENTION

Figure 1:
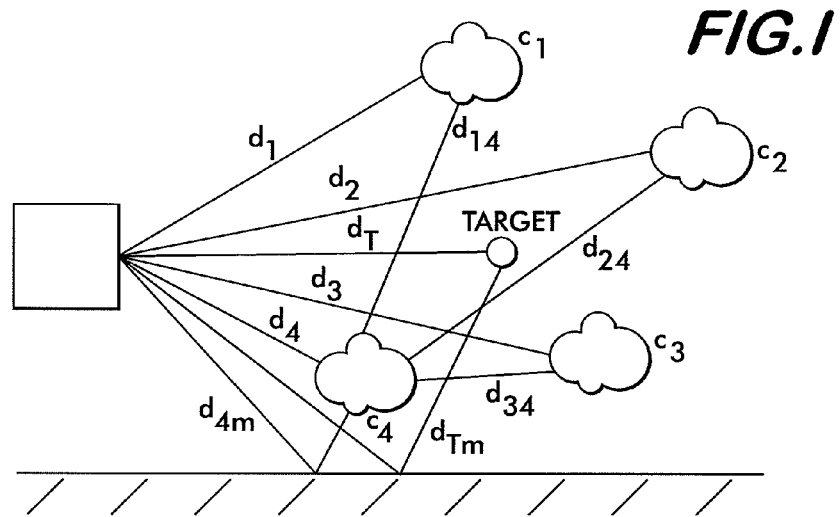
FIG. 1 is a schematic of a radar system of the prior art including a target, multipath and clutter.
Figure 2:
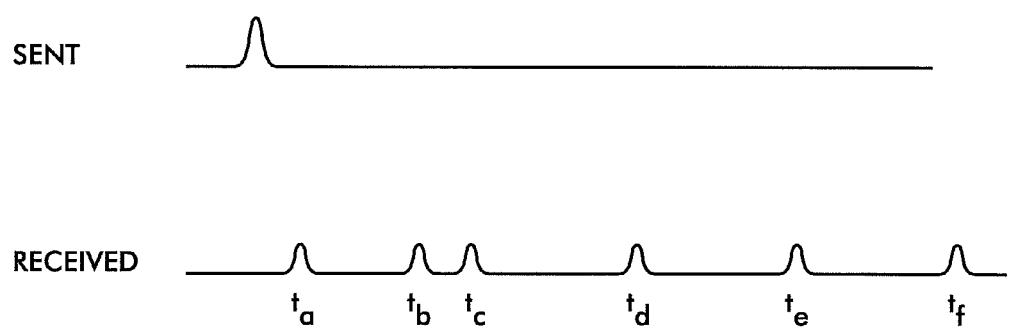
FIG. 2 shows a transmit and a receive signal of the radar system of FIG. 1.
Figure 3:
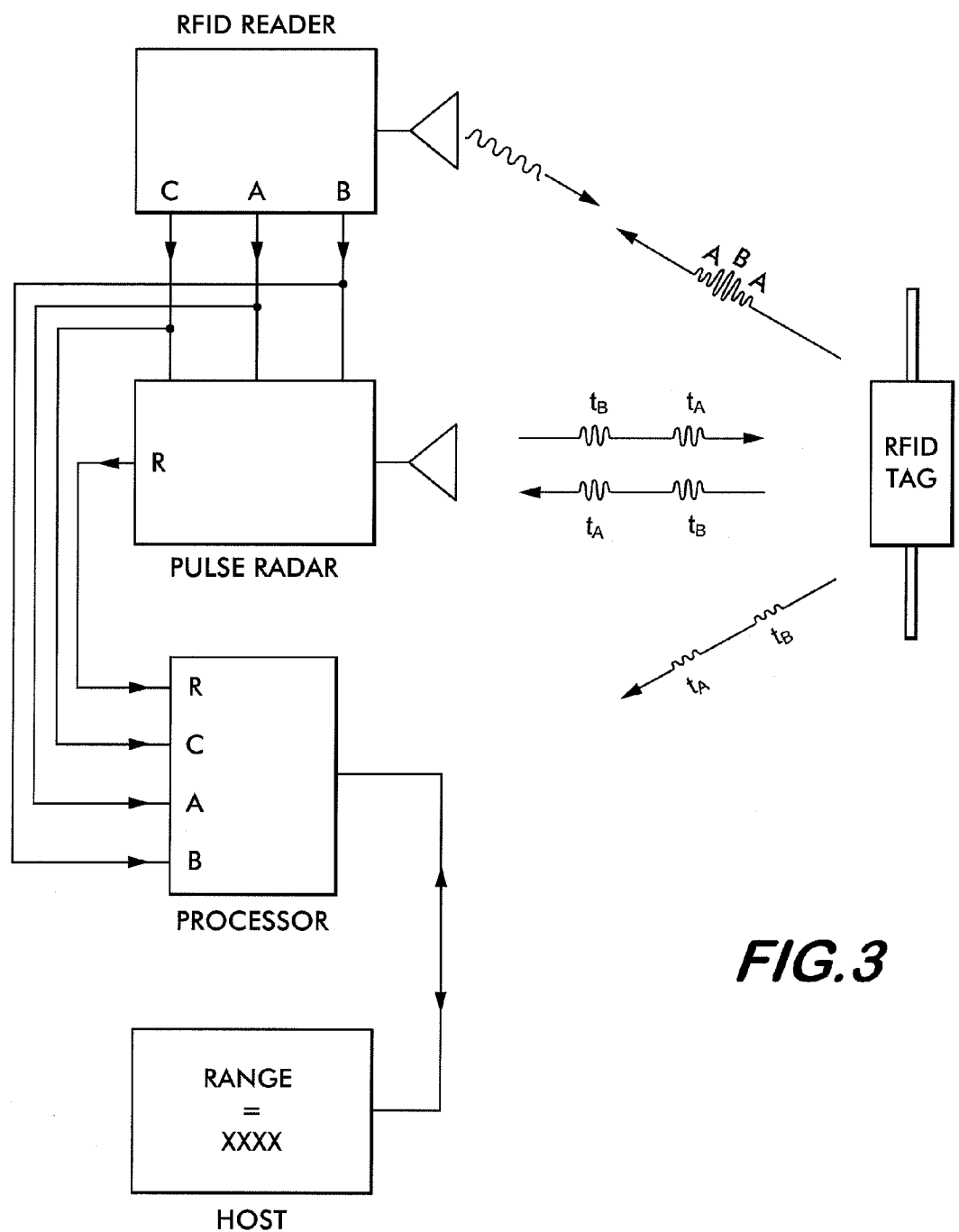
FIG. 3 is a schematic of a combined RFID system and radar system of the present invention.

The RFID Ranging system of the present invention is shown in FIG. 3. Clutter and multipath effects are not shown for clarity and to simplify the explanation of the operation of the invention. The signals of the system of FIG. 3 are shown in FIG. 4. FIG. 4 includes signals due to multiple targets and multipath, although the objects producing these signals are not shown in FIG. 3.

System Operation

The RFID reader and RFID tag shown in FIG. 3 operate in a normal fashion. The RFID reader sends several signals to the radar system as described below. During times that the RFID reader is sending continuous wave (CW) signals to the tag, and the tag is simultaneously changing modulation states, the radar system transmits RF radar signals to the tag at coordinated times and receives RF radar return signals from the tag (shown as pulses for illustration in FIG. 4). On occasion, the RFID reader may send modulated signals to the tag to control tag operation and send data to the tag (not shown in FIG. 4). During these times, the radar system is not required to transmit signals since the tag may not be modulating. While the RF carrier frequencies of the two systems may be the exactly same, there may be advantages if the RF carrier frequencies of the two systems are different from each other. The RF frequencies of the RFID system and the radar system may be in the same RF band or may be in different RF bands. For example, the RFID frequency may be 915 MHz and the radar frequency may be 10 GHz. A requirement is that the tag modulate its backscatter cross section with synchronized timing in the two bands.

The RFID reader decodes the information from the tag and produces a clock signal and synchronized signals indicating the state of modulation of the tag. The clock signal may be generated in the tag and recovered by the reader, or the reader may control the clock signal. Both of these methods and others are compatible with the present invention. The requirement is that the radar system know the modulation state of the tag and the times when the modulation state changes. The RFID reader recovers the modulation state to decode the data sent by the tag. The RFID reader sends the clock and modulation state signals to the radar system to be used for timing.

An example of a "Clock Signal" of 160 kHz is shown in FIG. 4. The reader generates the TAG MODULATION STATE which is shown in FIG. 4. The reader produces a signal to indicate when the tag is in "STATE A" and may produce an additional signal to indicate when the tag is in "STATE B". These signals are shown in FIG. 4. The reader sends these signals to the radar and/or processing sections of the system as shown in FIG. 3. The signals sent from the RFID Reader to the radar system may be of normal bandwidth and jitter for signals in the RFID system. High bandwidth and low jitter is only required for the radar ranging signals shown in FIG. 4.

The radar system shown in FIG. 3 transmits a RF signal to the tag during a convenient time when the tag is in modulation State A (example of the time labeled tA1, and receives a return signal VA (labeled with the circled numeral 1, FIG. 4). The signal VA is delayed or stored for later processing. Subsequently, the radar system transmits a signal to the tag during a convenient time when the tag is in modulation State B (example of the time labeled tB1, and receives a return signal VB (labeled with the circled numeral 2, FIG. 4). A difference signal is produced by subtracting the stored and/or delayed signal VA from the signal VB (or vice versa) using a common time reference such as time measured from the time of the transmit radar signal in each case. The output signal is V3=VB−VA (shown as "DIFFERENCE RECEIVED SIGNAL" in FIG. 4). The timings of signals VB and VA are referenced to the time of the beginning of the transmission of each individual RF signal transmitted by the radar. Thus, in the example, the timing of signal VA is delayed. The delay may be accomplished, for example, by sampling the signal and storing in a shift register, random access memory, or other methods such as a delay line. The subtraction of stored signals can be done by a microprocessor, a digital signal processor, or other computing device at normal computing speeds or by an analog subtraction. Accurate, low jitter and repeatable timing is required referenced to the timing of the particular transmit radar signal for each received radar return signal from the tag. Alternatively, a delay line such as a SAW delay line could be used to delay the radar return signal from a tag in one modulation state to a time when the modulation state of the tag changes to another state for direct analog subtraction. This option requires nanosecond accuracy in delay and launch of the second transmit radar signal (B) referenced from the time the first transmitted radar signal (A).

The shortest time between the start of signal VA and the end of signal VB may be about 8 microseconds for the type of RFD) systems referenced above. For example, the first transmit radar signal (A) may start 4 microseconds before a transition between states and be 2 microseconds long. The second transmit radar signal (B) may start 2 microseconds after the transition between states and be 2 microseconds long, resulting in a total time of 8 microseconds between the beginning and end of a set of the radar signals. If a tag is traveling at 200 kilometers per hour, the tag will move 0.44 mm during this time, resulting in insignificant error or jitter in measurement of distance compared to the desired precision. The doppler shift of a 1 GHz radar signal for an object speed of 200 kilometers per hour is 370 Hz, or 0.37 ppm. Thus, the distance to tags moving at high rates of speed can be measured with the methods of the present invention.

The only change between VA and VB of the targets in the field of the radar system is the modulation state of the tag. V3 contains only a signal (or signals if there is multipath from the tag) arising from the difference in modulation state of the tag. The time of the first signal observed in the difference signal V3 is due to the direct (shortest) distance between the radar system and the tag. Latter signals are due to multipath, as shown in FIG. 4. In this example, the round trip travel time of the radar signal to the tag and return is 65 nanoseconds, which corresponds to a one-way distance of 9.8 meters between the radar system and the tag. The system may be calibrated to remove delays due to constant distances such as the lengths of coaxial cables and the like in the radar system. The difference signals may be accumulated, averaged, or otherwise processed to improve signal to noise and resolution of timing. FIG. 4 shows radar signals as pulses for clarity of illustration but various types of signals may be used. The choice of radar signals is discussed below.

Thus, the distance to an individual tag can be found in the presence of clutter and multipath. The RFID reader may read the tag identification number or other data stored in the tag simultaneously as the radar system measures the distance to the tag.

Distance to an individual tag may be determined in the presence of multiple tags in the field by several methods. If the system uses tags that can be controlled, then all tags may be commanded to be silent except for the desired tag. If several tags are in the field and cannot be commanded on or off, then the difference signal V3 may be averaged. Only the modulation of the desired tag will be in synchronous with the radar signals. The radar return signals from other than the desired tag will diminish with averaging since these other signals occur at random times.

The radar system may operate with higher bandwidth and lower power than the RFID system to provide the required bandwidth needed for timing and also to comply with regulatory requirements.

The invention may be applied to other applications and implementations. For example, a target switching between modulation states at a constant rate may be used in place of a tag. A tag may use a second channel for radar ranging at a much different frequency than the RFID system. For example, the RFID system may operate at 915 MHz and the radar system at 5.8 GHz.

Detailed Description of Implementations

The present invention may be implemented using several approaches to improve performance of the basic ranging system outlined above.

Since a homodyne-type receiver is not required by the radar system, the radar return signals may be down converted to a convenient IF frequency for measurement and processing. The effects of self jamming and solution for a modulated backscatter RFID system using a quadrature homodyne receiver are well known in the art and consist of downconverting to baseband and filtering which achieves RF frequency stability and accuracy between transmitted and received signals economically with normal homodyne receiver designs to filter unwanted signals. However, the radar system of the present invention reduces or eliminates signals from unwanted sources (clutter) with a subtraction process outlined above. Further, a downconverting process can preserve information of RF frequency, modulation and timing, thus permitting reduced demands on the processing operations by operating at lower frequencies. (Indeed, the techniques of the present invention may be applied to a new type of modulated backscatter RFID reader with improved performance. If the radar pulses were transmitted several times during Modulation States A and B, the difference technique described above may determine the timings of the transitions between Modulation States A and B and thus enable decoding of the data sent by the tag without need for a homodyne receiver.)

The radar signals may be modulated in ways to improve performance. The modulation may be in the form of a chirp (increasing the RF frequency during the signal), phase modulation using direct sequence or other techniques, frequency modulation using direct sequence or other techniques, amplitude modulation using direct sequence or other techniques, or others. The modulations may be chosen to improve the power within a radar signal, improve the signal to noise ratio, improve the resolution of timing, reduce noise, and for other reasons. For example, the subtraction process outlined above may increase the noise level since each signal may contain uncorrelated noise. Thus, the subtraction process will benefit from noise reduction techniques.

The fine measurement of distance to the tag (A. R. Koelle and S. W. Depp, "Doppler radar with cooperative target measures to zero velocity and senses the direction of motion", Proc. of IEEE, V10, pp 492-493, March 1977) may be used with the present invention to produce an enhanced measurement of distance to a tag to enhance a coarser measurement of distance using round trip timing of radar signals.

Implementation of the present invention consists of the following subsystems, components, processes and steps:

1. An RFID reader acquires a tag and produces signals that indicate modulation states of the tag and optionally the clock and/or timings of the changes of a modulation states of the tag.

2. A radar system transmits and receives signals coordinated with the state and timing of modulation states of the tag.

3. The signals received by the radar system are processed to determine the distance to the tag by:

a. Subtracting the received radar signal while the tag is modulating in one state from the radar signal while the tag is modulating in another state producing a difference signal. One of the states may be when the tag is not returning a backscattered signal. The subtraction process eliminates radar returns uncoordinated with the timing of modulation states of the tag. Thus only signals from the tag remain. The subtraction process may increase the noise level.

b. Calculating the distance, d, to a tag by determining the smallest time delay between the transmit and receive radar signals of the difference signal with the formula d=ct/2 where c is the speed of light and t is the smallest time delay. Later signals may be due to multipath propagation and thus are rejected. Signal correlation techniques may be used to process the received signals to automate and/or improve performance.

Various methods may be used to implement these steps and improve performance. Pulse compression techniques may be used to improve range resolution, reduce noise and improve signal to noise ratios. Pulse compression techniques may use frequency modulation, phase modulation or amplitude modulation followed by matched filtering in the receiver processing. Downconversion of the signals to intermediate frequencies may be used. These and other processes may be performed in various sequences. The sequence chosen may depend on selection of the importance of other measures such as complexity, cost, ease of implementation, reduction of noise, range resolution, bandwidth, transmitted power, etc. The operations discussed above may be performed in various sequences for linear processes and may be found useful for nonlinear processes. For example, the subtraction process may be done on the raw received signal, downconverted signals, before or after filtering with matched filters, in the time domain, in the frequency domain for signals processed by Fast Fourier Transform (FFT), and the like. Weighing of transmitted and received signals may be performed to reduce the bandwidth of the signals or side lobes in signal correlations.

Examples are presented here to illustrate several techniques and results using methods and processes of the present invention.

EXAMPLE 1

The following simulation illustrates the process of ranging to a tag using the process outlined above.

Figure 5B:
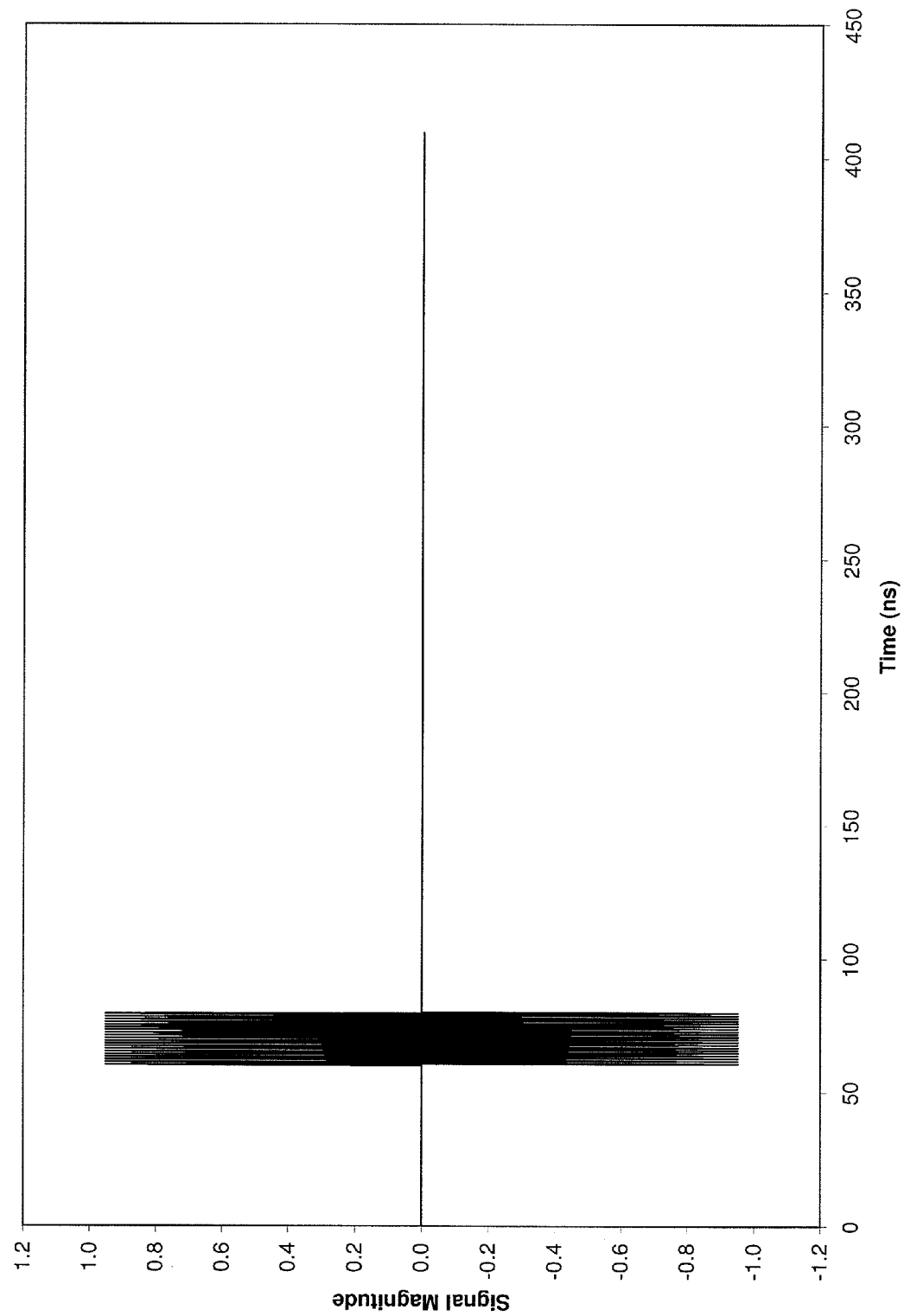
FIG. 5b is a graph of a return radar signal from a single source of clutter while a tag is not reflecting.
Figure 5C:
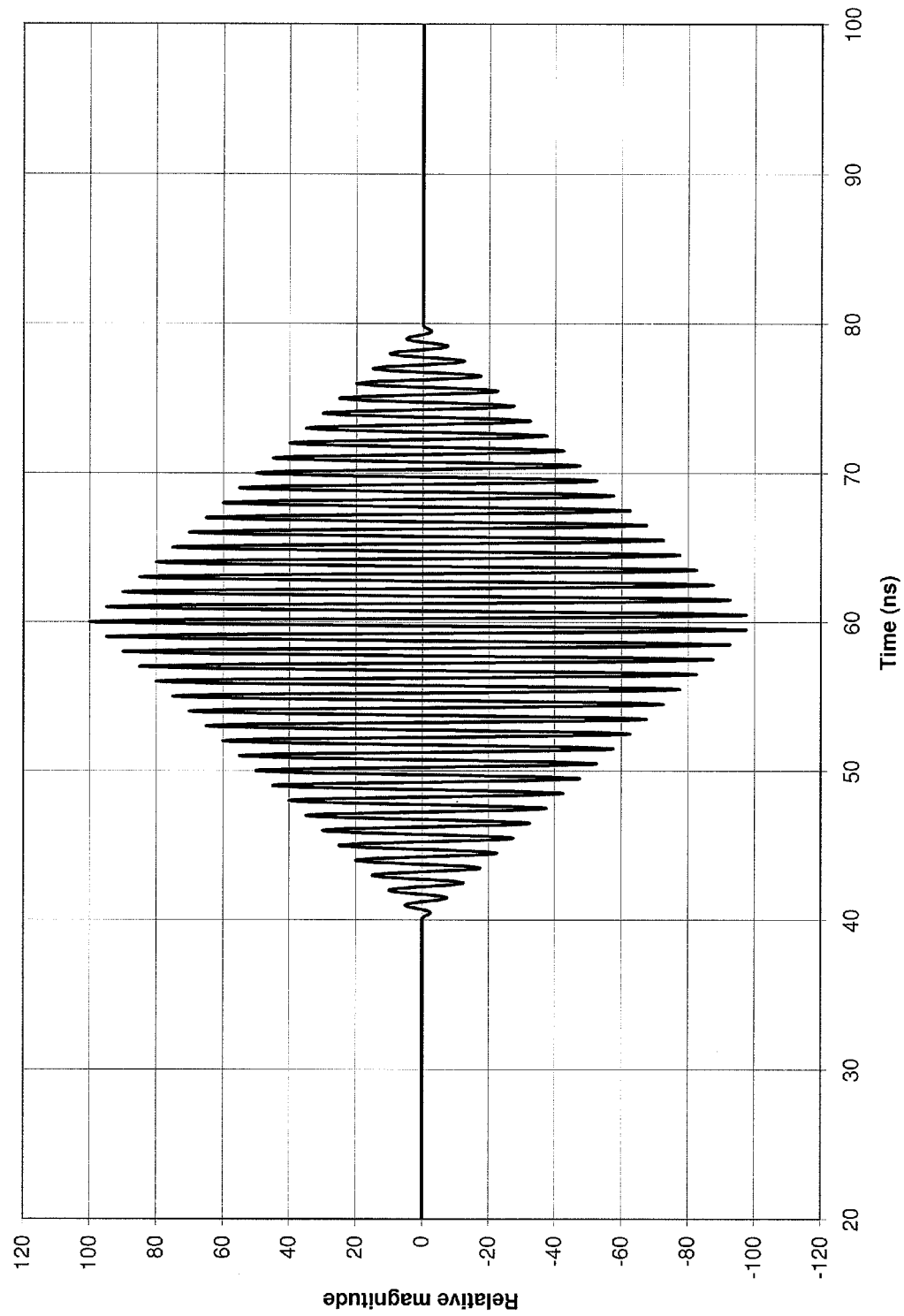
FIG. 5c is a graph of a correlation of the transmit radar signal with the return radar signal of FIG. 5b.

The radar ranging process used in this example performs a subtraction of processed signals:

Transmit radar signals coordinated with the modulation state of the tag
  Receive reflected radar signals for each of the modulation states of the tag
  Use an analog to digital converter (A/D) or equivalent to sample the signals
  Process each of the sampled signals using a fast Fourier transform (FFT) to produce complex signal spectrums
  Form the complex conjugate of the FFT of the transmit signal
  Form products by multiplying the complex conjugate of the transmit signal with the FFT of each received signal individually
  Produce a correlation for each received signal individually by performing an inverse FFT of each product
  Subtract the correlation obtained with the tag modulation in one state from the correlation with the tag modulation in the other state
  Determine the round trip time delay from the time of the peak in the difference of the correlations A transmit radar signal that is unmodulated with a RF frequency of 1 GHz and a duration of 20 ns is shown in FIG. 5a. A return signal from a single target (clutter) is shown in FIG. 5b, normalized to the same amplitude as the signal in FIG. 5a (propagation would diminish the amplitude of the return signal but this effect is important only in signal to noise considerations and not timing). For this example, it is assumed that this signal arises from a stationary target while the tag is not modulating. The state of the tag may be assigned to Modulation State A. The correlation of the return signal with the transmitted signal is shown in FIG. 5c and was found using the Fast Fourier Transform process outlined above. The distance to this stationary target can be calculated from the time of the peak of the correlation, ie at a time of 60 ns. The peak of this correlation is broad and not well defined. The correlation is greater than 50% from 50 ns to 70 ns, which could lead to uncertainty of accuracy if the signal contains noise. (These data are simulations using Microsoft® Excel® fast Fourier transforms, FFT, and complex arithmetic without adjustments of scale.)

The return signal is shown in FIG. 5d when the tag is modulating in State B in addition to the return from the stationary target. This example shows the results if the delay to the tag is 10 ns greater than the delay to the stationary target, and if the strength of the return signal produced by State B is 30% of the strength of the return signal produced by the stationary target. The correlation of the signal of FIG. 5d with the transmitted signal is shown in FIG. 5e.

Figure 5F:
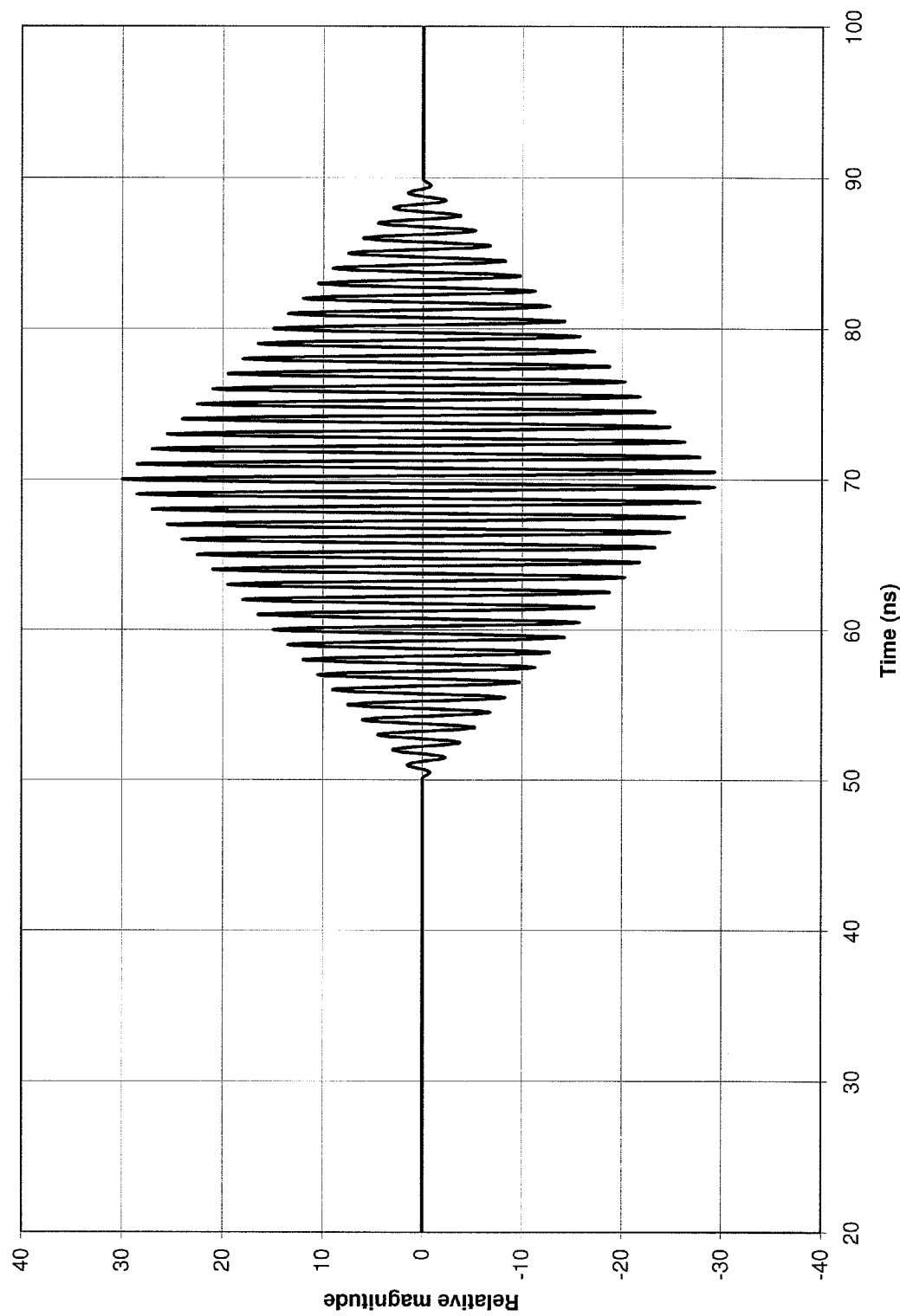
FIG. 5f is a graph of a correlation of the transmit radar signal with the return radar signal from the tag alone.

The correlation of FIG. 5c is subtracted from the correlation of FIG. 5e and is shown in FIG. 5f. In this example, the subtraction of signals when the tag is in different modulation states is done after correlations have been performed using FFT techniques. Only signals originating from the tag remain in FIG. 5f. From the peak of the correlation, the round trip time to the tag is 70 ns and the distance to the tag is 10.5 m. The correlation is greater than 50% from 60 ns to 80 ns, which leads to uncertainty of accuracy if the signal contains noise.

Alternatively, the unprocessed signal of FIG. 5b may be subtracted from the unprocessed signal of FIG. 5d leaving only the signal due to the tag (result not shown), and distance determined by correlation or best fit of a 20 ns pulse to the result. This direct subtraction may not be useful if the signals are noisy since the subtraction may increase the noise level. This is illustrated by the subtraction of unprocessed noisy signals is shown for another example in FIG. 6g. The example illustrates an embodiment of the invention and shows that the subtraction process may be performed on signals that are processed before the subtraction.

This radar signal of this example is not efficient with bandwidth nor will provide an accurate time delay if the signals are noisy. The −20 dBc bandwidth is about 350 MHz and the correlation is above 50% within a 20 ns time window. This example illustrates that the invention is capable of ranging to a tag that is in the presence of a nearby interfering reflecting target and a for a tag that produces a reflection smaller than the nearby interfering target. Comparison of FIG. 5c to FIG. 5f shows that the tag return occurs 10 ns after the return from the fixed target, and is 0.3 times the magnitude of the fixed target or 10.5 dB smaller.

EXAMPLE 2

A second example follows the process of Example 1 with several modifications. In this example, parameters and modulations are chosen to improve performance.

Example 2 uses the following parameters:
   A transmit chirp radar signal with constant amplitude (other than limited rise and fall times) with a frequency that increases linearly by 100 MHz in 2048 ns
   Rise and fall times limited to 100 ns to reduce out of band emissions
   Downconvert the received signals into the band from 50 MHz to 150 MHz
   Clutter consisting of two stationary targets, the return radar signal from the first has a round trip time delay of 60 ns and a relative strength of 1, and the return radar signal from the second has a round trip time delay of 70 ns and a relative strength of 0.3
   A radar return signal from a tag with a round trip time delay of 65 ns and a relative strength of 0.2 when modulating in Mode B and 0.0 when modulating in Mode A
   Uncorrelated white Gaussian noise with a relative strength of −3 dB from the signal produced by the tag modulating in Mode B is added to each return radar signal. The correlation between noise signals in different return radar signals is less than 0.01 (i.e. the noise in one return radar signal is uncorrelated with the noise signal in another return radar signal).

Thus, the returned signals contain significant noise and the tag produces a signal significantly smaller signal than the stationary targets and has a round trip time delay within 5 ns of the other targets. The duration of the radar signal is 410 times larger than the time delay between the tag and interfering reflecting targets. This example illustrates several features of using pulse compression techniques of the present invention. These features may be used together or in various combinations. The techniques of the example may be altered to use coded phase and/or amplitude modulation common to CDMA (code division multiple access) pulse compression methods.

Figure 6B:
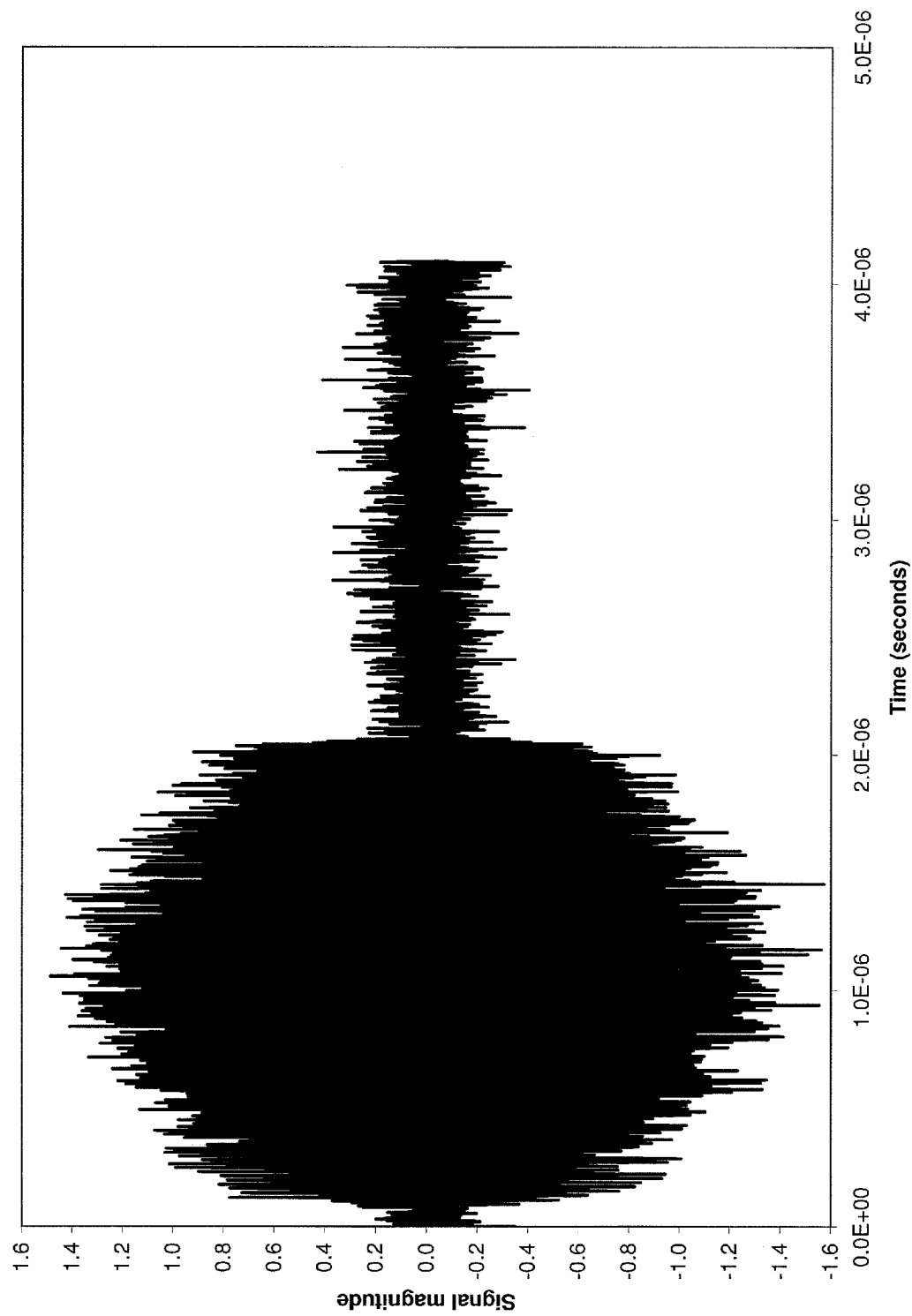
FIG. 6b is a graph of a return radar signal from two sources of clutter while a tag is not reflecting.
Figure 6C:
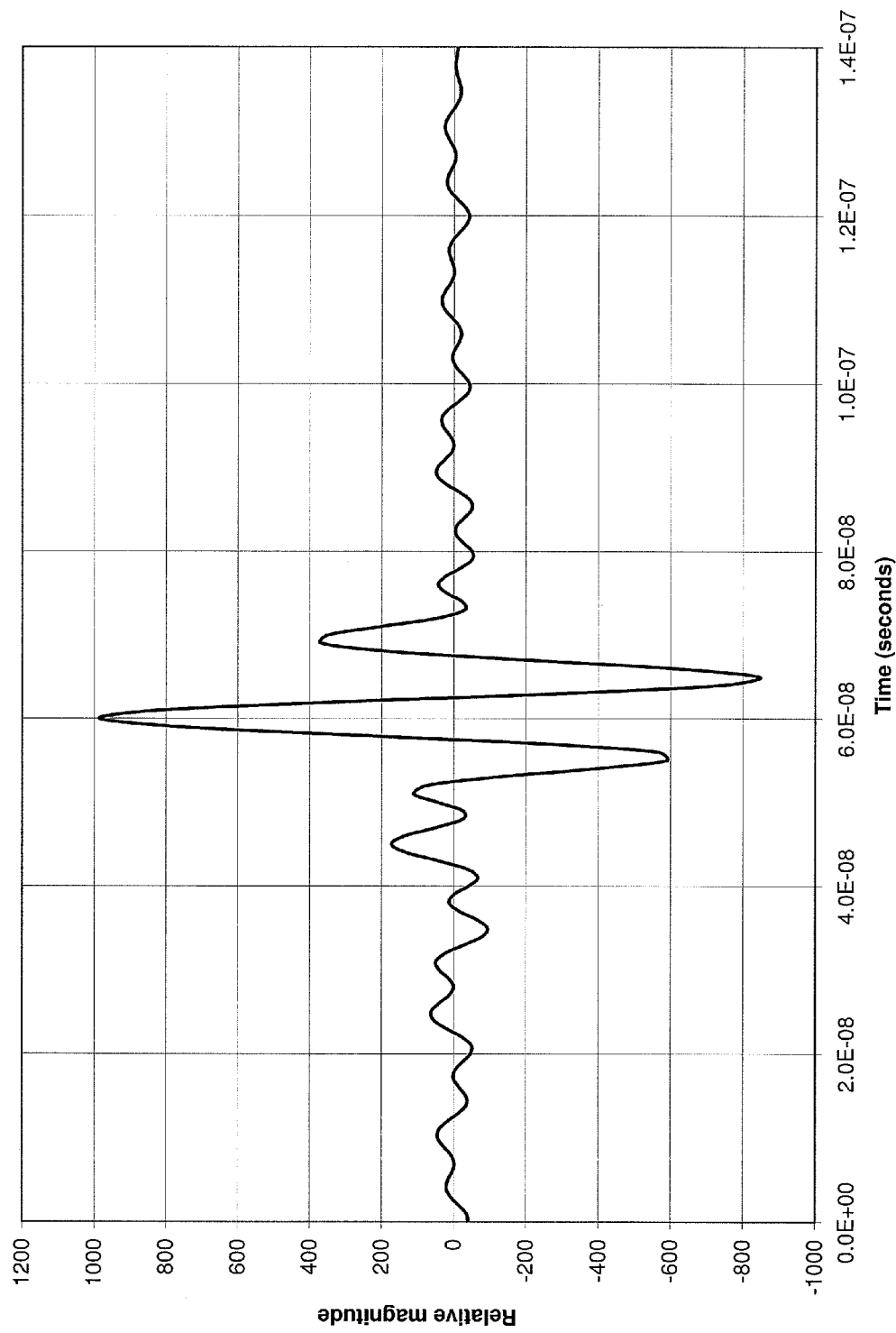
FIG. 6c is a graph of a correlation of the transmit radar signal with the return radar signal of FIG. 6b.
Figure 6E:
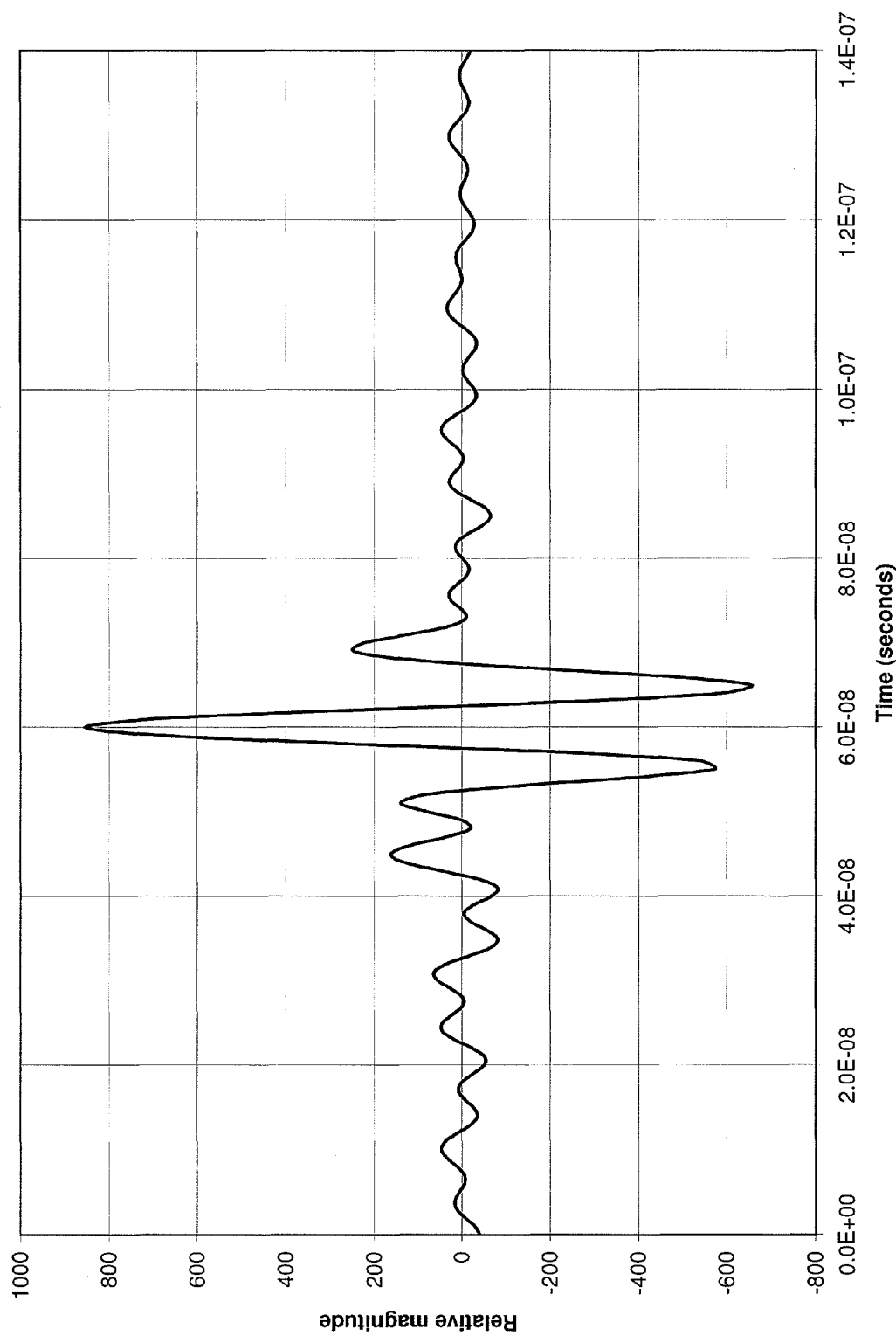
FIG. 6e is a graph of a correlation of the transmit radar signal with the return radar signal of FIG. 6d.
Figure 6F:
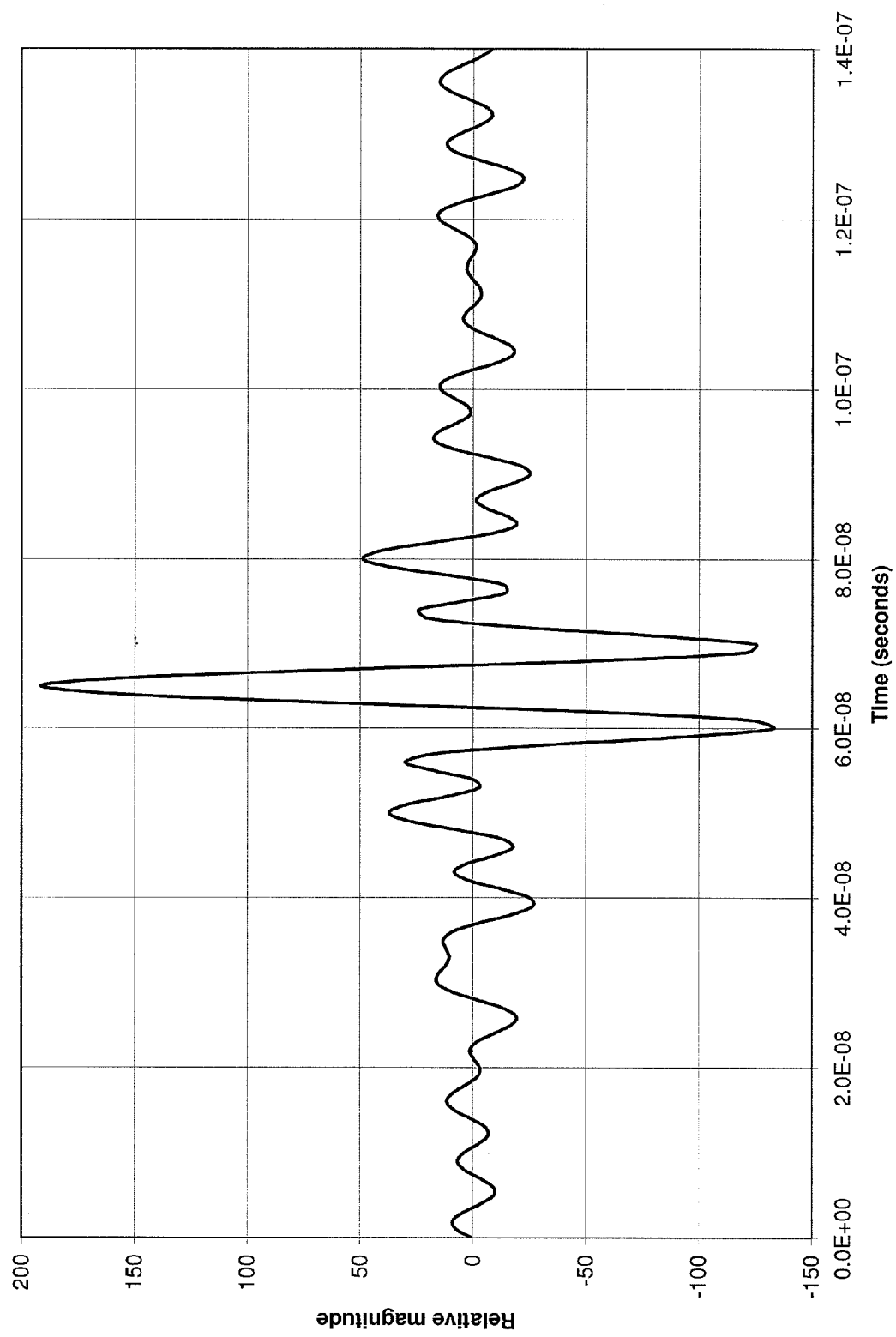
FIG. 6f is a graph of a correlation of the transmit radar signal with the return radar signal from the tag alone.
Figure 6G:
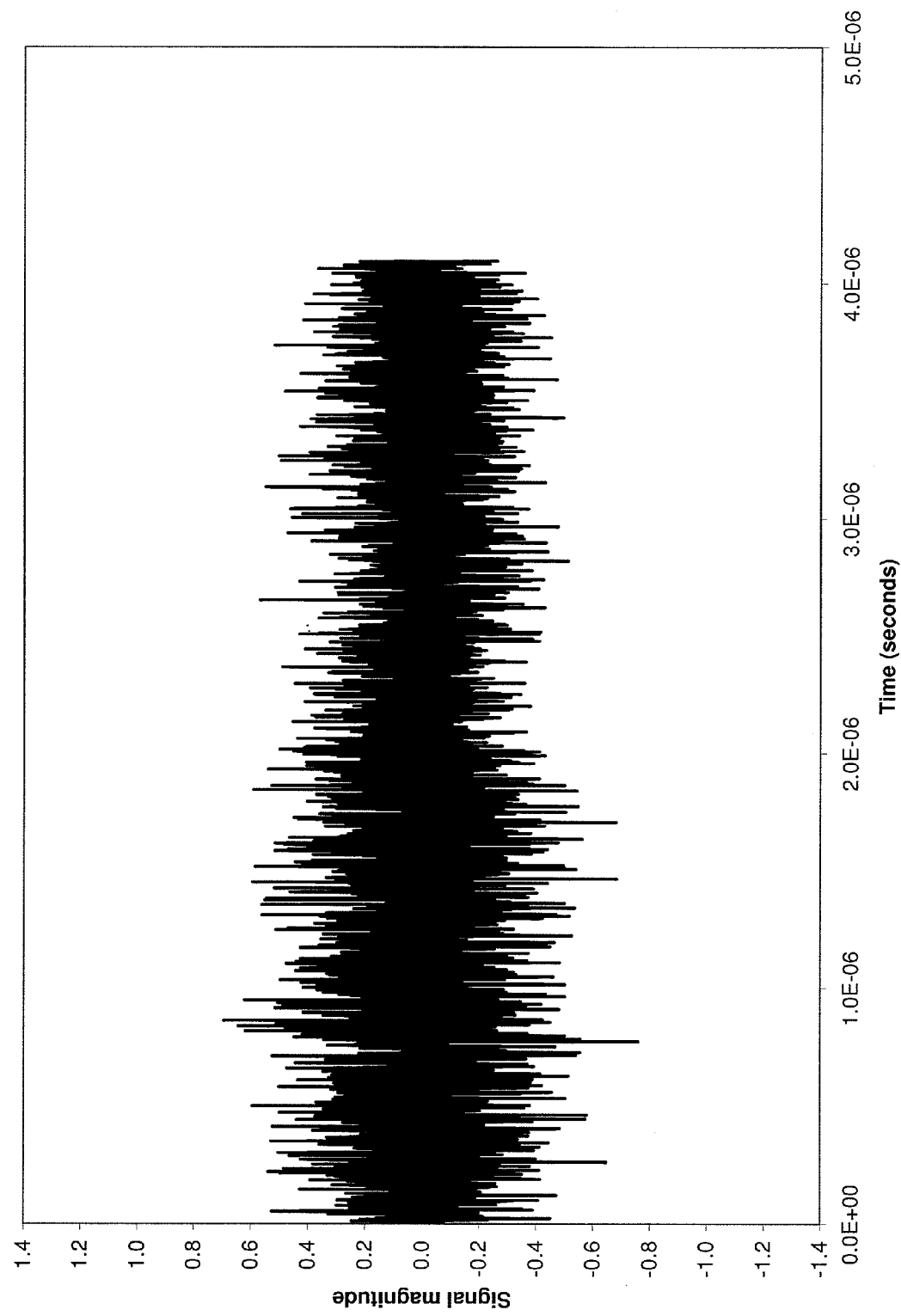
FIG. 6g is a graph of a return radar signal from the tag alone.

The transmit radar signal is shown in FIG. 6a. The return radar signal from the two targets alone is shown in FIG. 6b. The correlation of the return radar signal without the tag with the transmit radar signal is shown in FIG. 6c. The return radar signal from all three targets is shown in FIG. 6d. The correlation of the return radar signal from all three targets is shown in FIG. 6e. The correlation of the radar return signal from the tag is calculated from the subtraction of the correlation of FIG. 6c from the correlation of FIG. 6e and is shown in FIG. 6f. For illustrative purposes, the radar return signal from the tag can be calculated from the subtraction of the signal shown in FIG. 6b from the signal shown in FIG. 6d. This signal is shown in FIG. 6g and was not used directly in the process outlined here. FIG. 6g illustrates that the subtraction process increases the noise level since the noise levels in FIG. 6b and FIG. 6d are uncorrelated. The tag signal is not discernable by casual inspection of FIG. 6g, but the pulse compression process improves the signal to noise ratio significantly, and the subtraction of the correlations revels the time delay of the tag radar return signal clearly (FIG. 6f). The −20 dBc bandwidth of the transmitted pulse is about 108 MHz, much less than Example 1 with much improved accuracy. (For ease of viewing, all figures, the plots were drawn using the Excel smoothing option.) The peak of the correlation is at a time of 65 ns, and thus, the one way distance to the tag is 9.75 m.

In this example, the side lobes of the correlation extend over a span of about 10 ns to 15 ns. Thus, targets (either individual stationary or due to multipath) will be detected but not completely resolved in timing if the returns occur within about 10 ns of each other. Inspection of FIG. 6c shows that the time delay of the larger target is determined correctly (60 ns) but the time delay of the smaller target, while its effects are visible, are not readily discernable. The correlation function is known, so curve fitting techniques may prove useful in resolving the two targets individually from the data shown in FIG. 6c.

This example has illustrated a preferred embodiment of the present invention. The self jamming effect in conventional radar is eliminated with the present invention since these self jamming signals appear as another stationary target and are eliminated by the subtraction process between radar returns when the tag is in different modulation states. Thus the distance to a tag may be found in cases where the first return from a tag occurs during the transmit signal. The radar system may include separate transmit and receive antennas to reduce the effects of the transmit radar signal entering the received signal channel.

Simulations show that a pulse compression process outlined here successfully suppresses RF signals uncoordinated with the tag modulation including CW signals with frequencies in the band of the radar signal, can resolve multipath signals from the tag, and parameters can be chosen to optimize the system for various conditions. The examples provided here use a chirp radar signal and matched filtering. The invention may also be implemented with phase modulation, Barker codes, pseudo random modulations, and other like forms of modulation to improve performance and accuracy.

EXAMPLE 3

Figure 7:
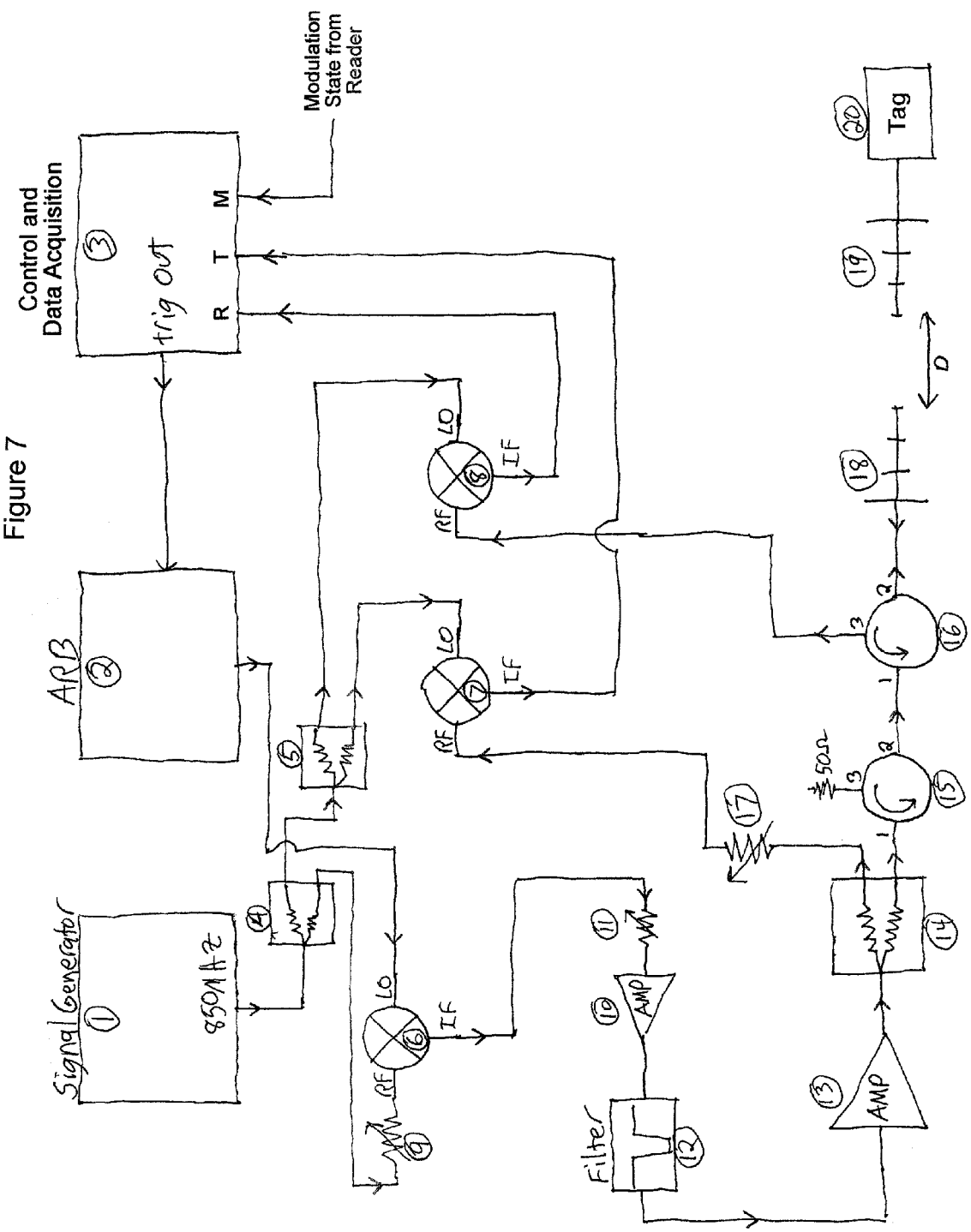
FIG. 7 is a block diagram of an exemplary mono-static radar system.

Methods shown in Example 1 and Example 2 illustrate the technique of differential pulse compression radar to measure the distance to a tag in the presence of clutter and multipath. Example 2 also shows the ability of the methods to suppress amplitude noise as shown in FIG. 6b through FIG. 6g. Implementation of the methods are improved by consistency in timing, frequency and amplitude and minimizing jitter of the transmitted radar pulses and subsequent data processing. An improved differential pulse compression radar is shown in FIG. 7. The RFID Reader, Host and data processing sections of FIG. 3 have been omitted for clarity.

Operation is performed using a minimum set of signals. First, timing is derived from a signal (from a reader or other source) indicting the modulation state of the tag being read. An example of such a signal is the "TAG MODULATION STATE" of FIG. 4 and "Modulation State from Reader" on FIG. 7. Further referring to FIG. 7, Signal Generator 1 (Agilent MXG N5182a) provides a reference RF signal of 850 MHz in this example although other suitable frequencies could be used. An arbitrary wave form generator ARB 2, (Tektronix AWG5002B) is programmed with the desired waveform to be used in the pulse compression technique. In this example, the arbitrary waveform is a linear sweep from 52 MHz to 78 MHz in a period of 2 microseconds, also referred to as a 'chirp' signal. The start of the sweep is controlled by the Control and Data Acquisition module 3 (LeCroy LT-354ML). The trigger to start the transmitted chirp signal and the trigger to begin data acquisition are both synchronized to the Tag Modulation State signal.

Control and Data Acquisition module 3 is used to coordinate timing and acquire, digitize, record and display data. Control and Data Acquisition module 3 receives the Modulation State Signal of Tag 20 and generates a trigger signal to control the timing of a chirp signal produced by ARB 2.

ARB 2 generates a chirp signal with a duration of 2 microseconds that starts at 52 MHz and increases linearly to 78 MHz. The chirp signal from ARB 2 is sent to Splitter 4 (Mini-Circuits ZAPD-1) and then to the local oscillator port of Mixer 6 (Anzac MDC-149). The parameters of the chirp could be tailored for the modulation used by the RFID system of interest. Here, the values are suitable for the signals specified in ISO 10374 or other RFID systems for use in the 915 MHz ISM band in the United States. Other choices could be made and would be within the scope of the invention.

Signal Generator 1 produces a constant 850 MHz signal which is split into two signals by Splitter 4. One of the signals from Splitter 4 is sent to the RF port of Mixer 6. Attenuator 9 (JFW 50R-102) is adjusted to provide the desired signal level to Mixer 6. The other part of the 850 MHz signal produced by Signal Generator 1 is further split by Splitter 5 (Mini-Circuits ZAPD-1) and feeds the LO ports of both Mixer 7 (Mini-Circuits ZP-2MH) and Mixer 8 (Anzac MDC-149).

Mixer 6 multiplies the signals input to its RF and LO ports producing an up-converted output signal at the IF port. The output signal contains an RF chirp signal with a duration of 2 microseconds that starts at 902 MHz and increases linearly to 928 MHz. Other unwanted signals are removed by Filter 12 (Cir-Q-TEL 21377). The desired chirp signal travels through Attenuator 11 (JFW 50R-102), amplifier AMP 10 (Mini-Circuits ZKL-2R7), Filter 12, AMP 13 (Amplifier Research 1W1000B), Splitter 14 (Mini-Circuits ZAPD-1), Isolator 15 (MA-COM 7N-195), Circulator 16 (MA-COM 7N195) and is transmitted to the Tag Antenna 19 by Antenna 18. Various suitable antennas may be used depending on the desired gain pattern and other requirements for mounting and environment. The other output of the Splitter 14 is sent to attenuator 17 (Agilent 8495B) and then to the RF port of Mixer 7. The down-converted transmitted signal is sent to the Control and Data Acquisition module 3 to be used in the pulse compression process.

The signal received by Tag Antenna 19 is modulated by Tag circuitry 20, backscattered, and received by Antenna 18, then sent to Mixer 8 by Circulator 16. The IF outputs of Mixer 7 and Mixer 8 are the down converted transmitted and received signals respectively. These down converted signals are sent to Control and Data Acquisition module 3 for data acquisition, digitization, display and recording.

The recorded signals are processed to compress the signals using the FFT method of the invention described here in and in Example 1 and Example 2 to determine the round trip time delay to the tag. Measurements were taken for various fixed distances D. Calculations were performed using Microsoft's Excel® spreadsheet program. Calculations could be made by various methods including microprocessor, DSP, or equivalent.

Figure 8:
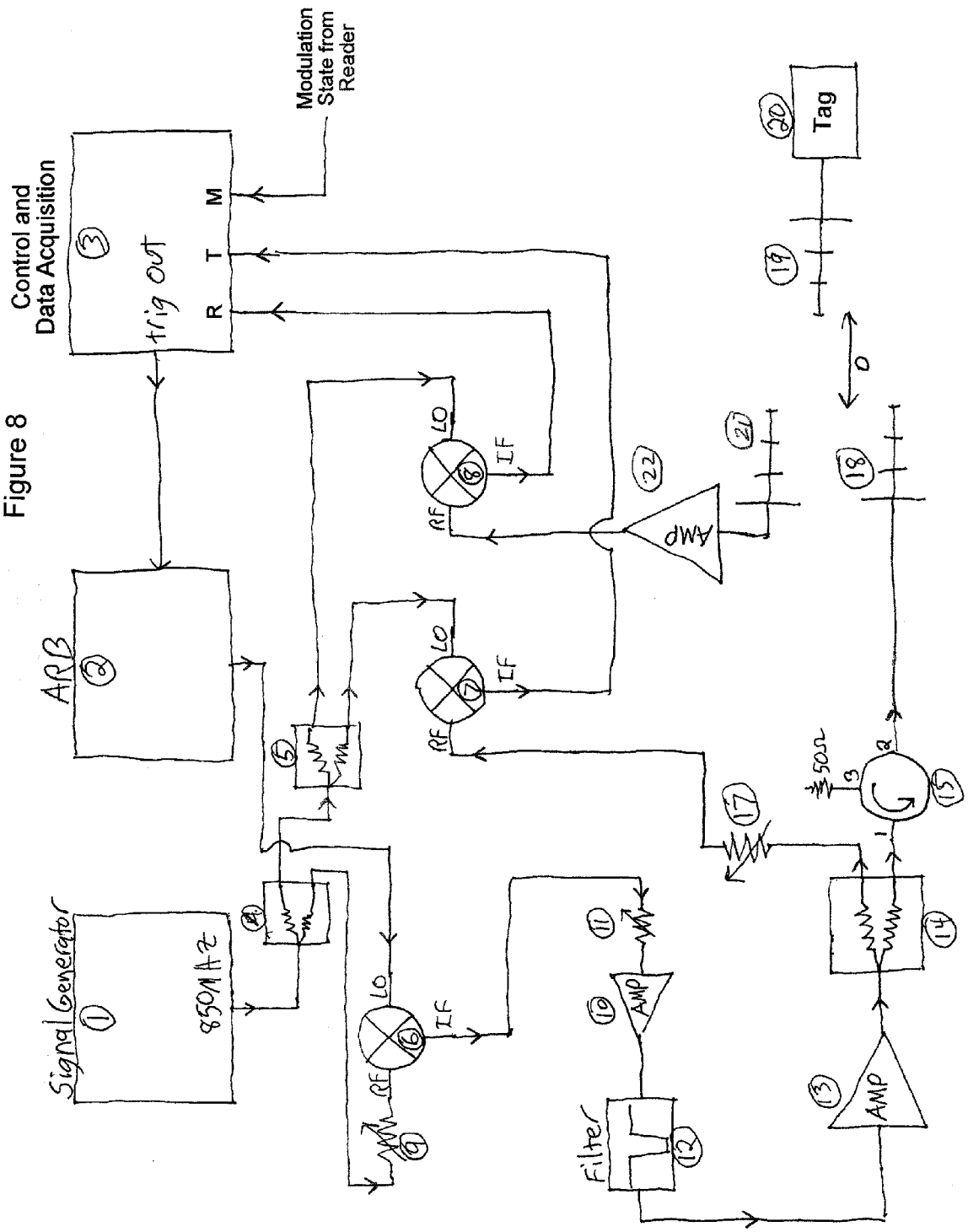
FIG. 8 is a block diagram of an exemplary bi-static radar system.
Figure 9A:
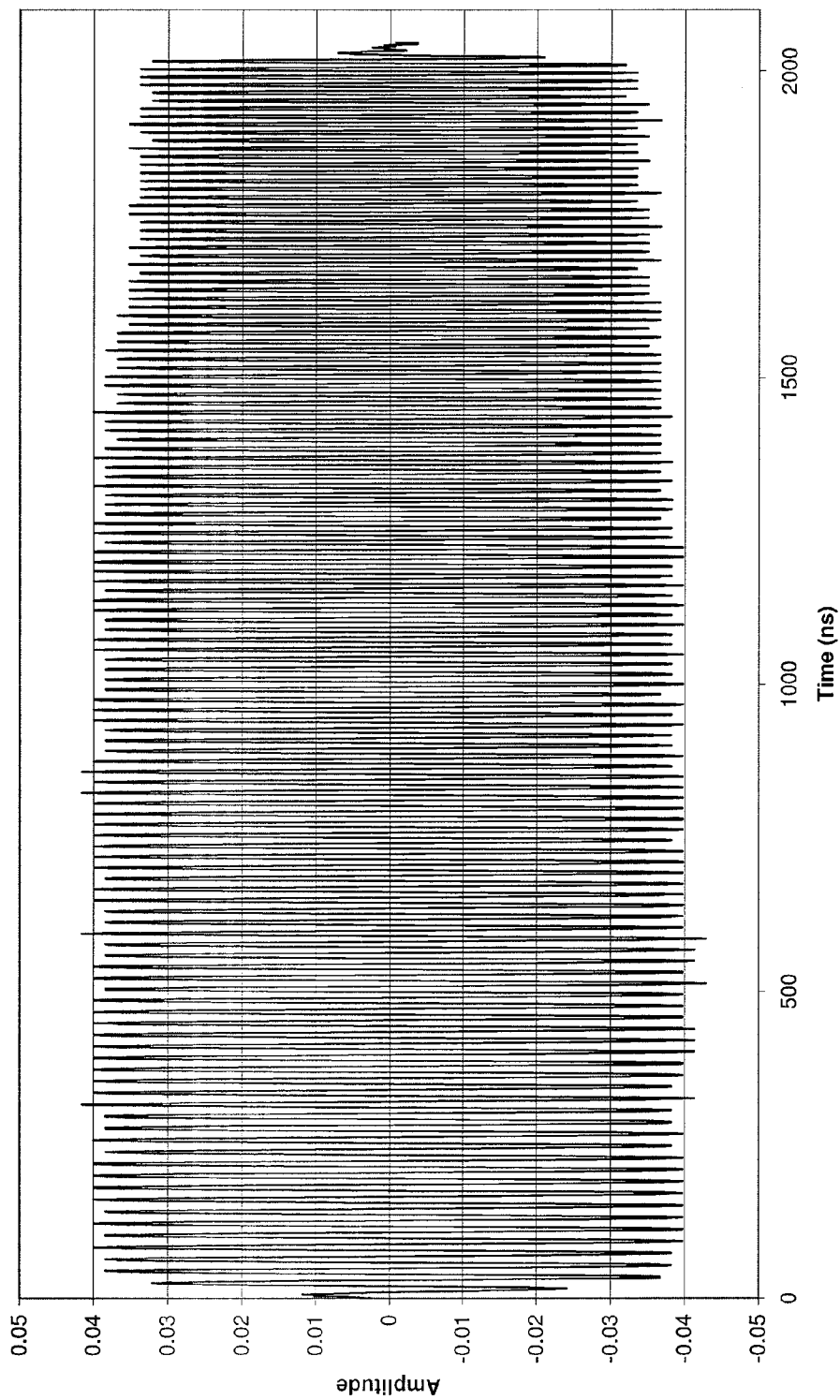
FIG. 9a is a plot of transmit signal for a vehicle at 14 feet.
Figure 9B:
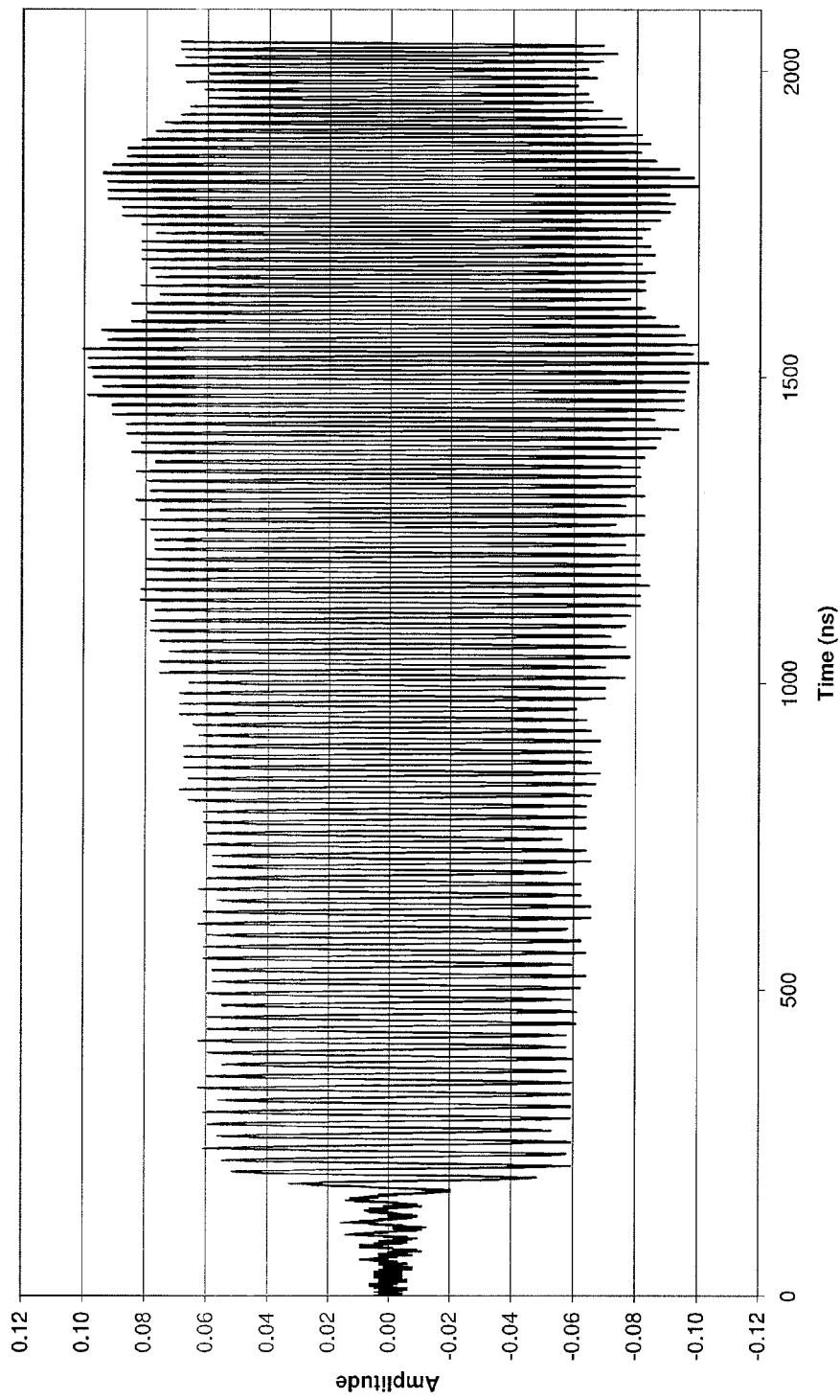
FIG. 9b is a plot of a receive signal state A for a vehicle at 14 feet.
Figure 9C:
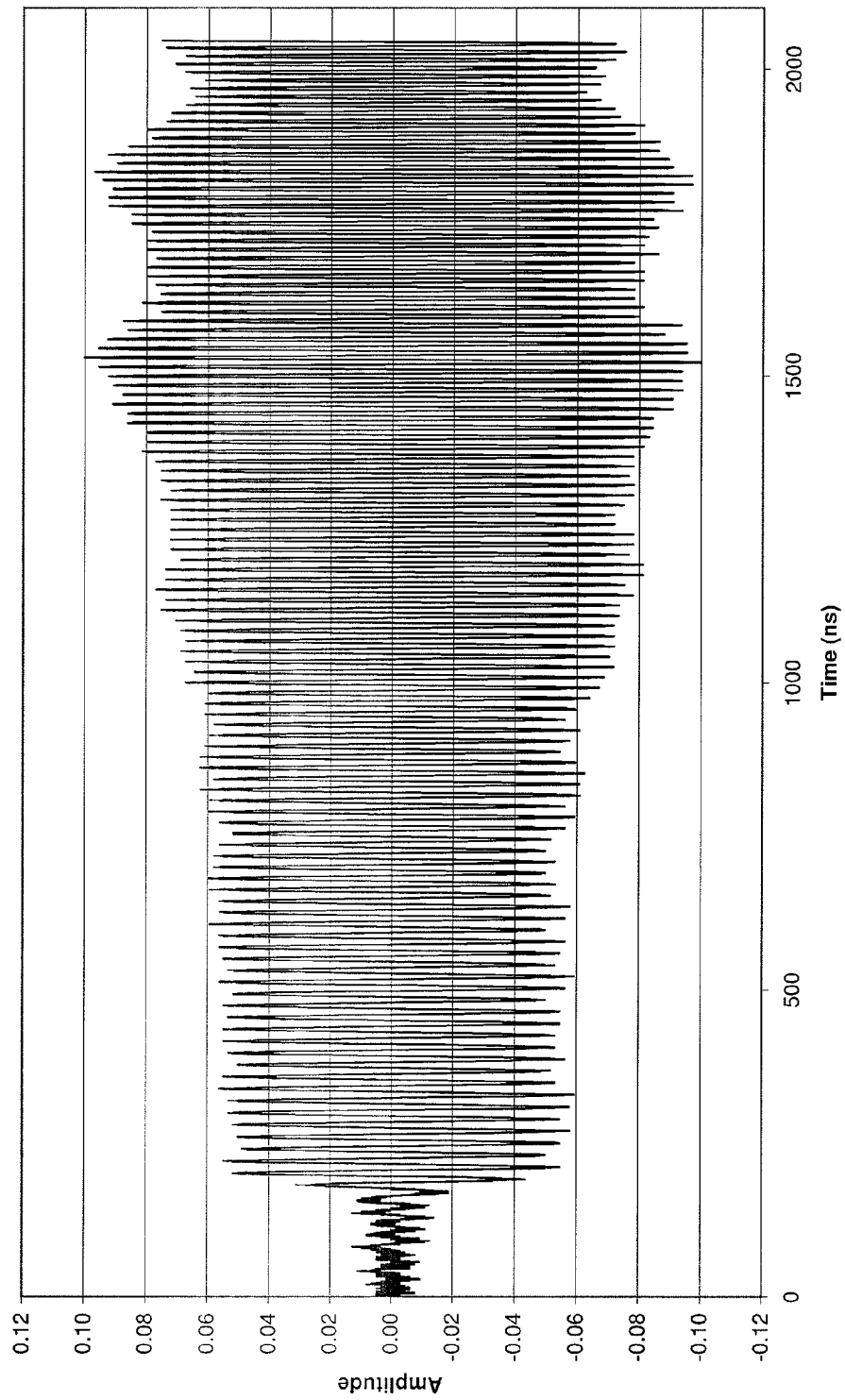
FIG. 9c is a plot of a receive signal state B for a vehicle at 14 feet.
Figure 9D:
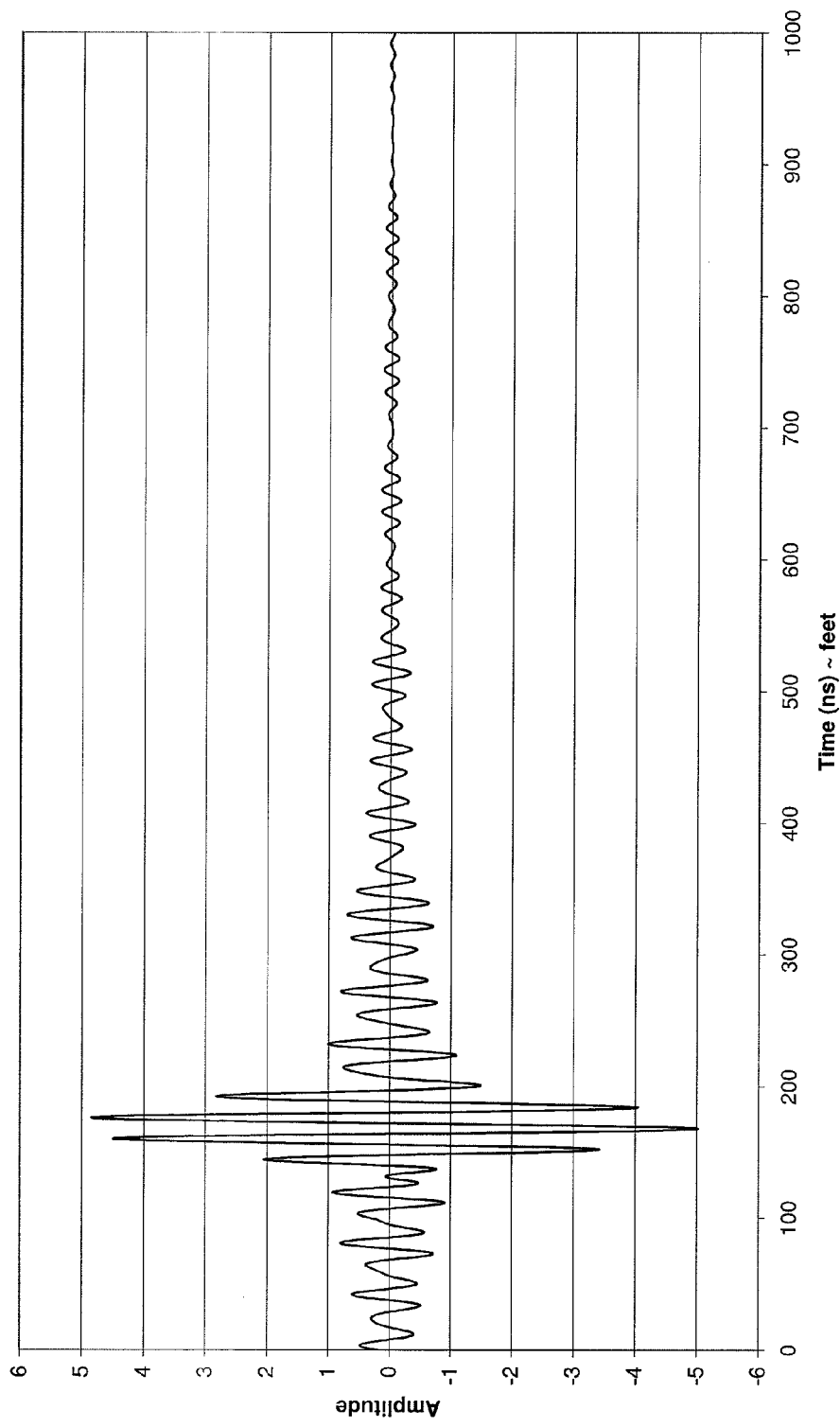
FIG. 9d is a plot of a compressed receive signal state A for a vehicle at 14 feet.
Figure 9E:
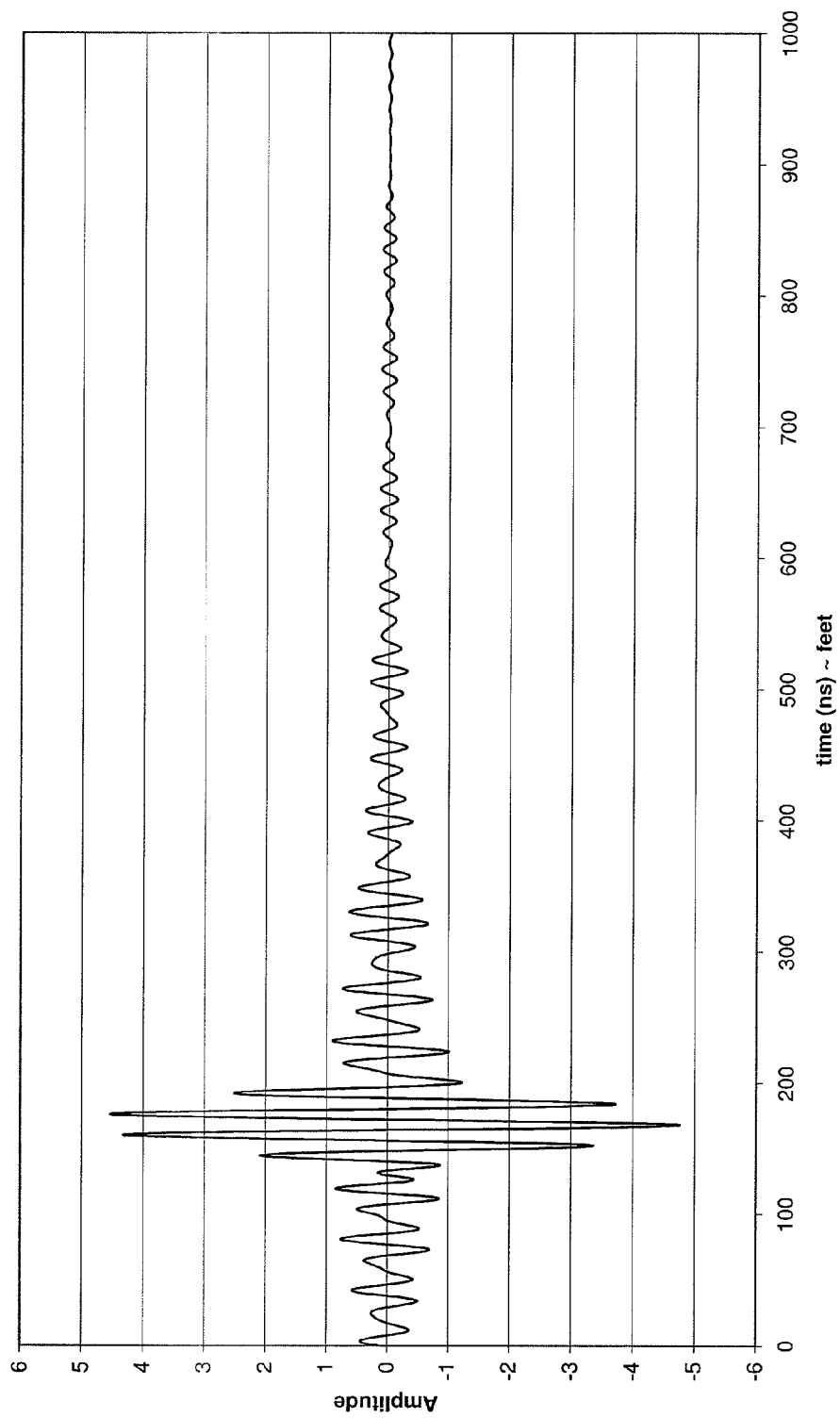
FIG. 9e is a plot of a compressed receive signal state B for a vehicle at 14 feet.
Figure 9F:
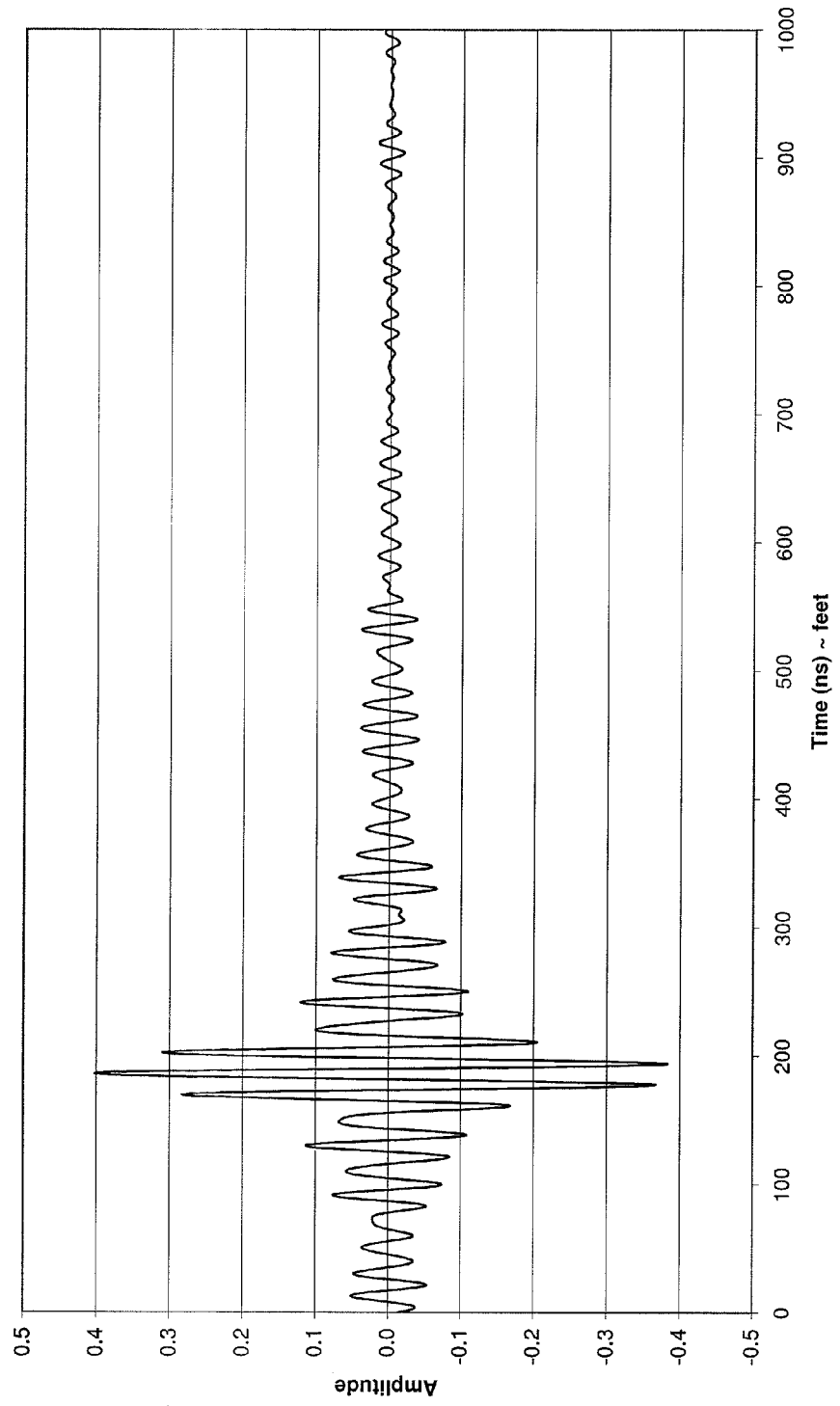
FIG. 9f is a plot of a differential compressed receive signal for a vehicle at 14 feet.
Figure 9G:
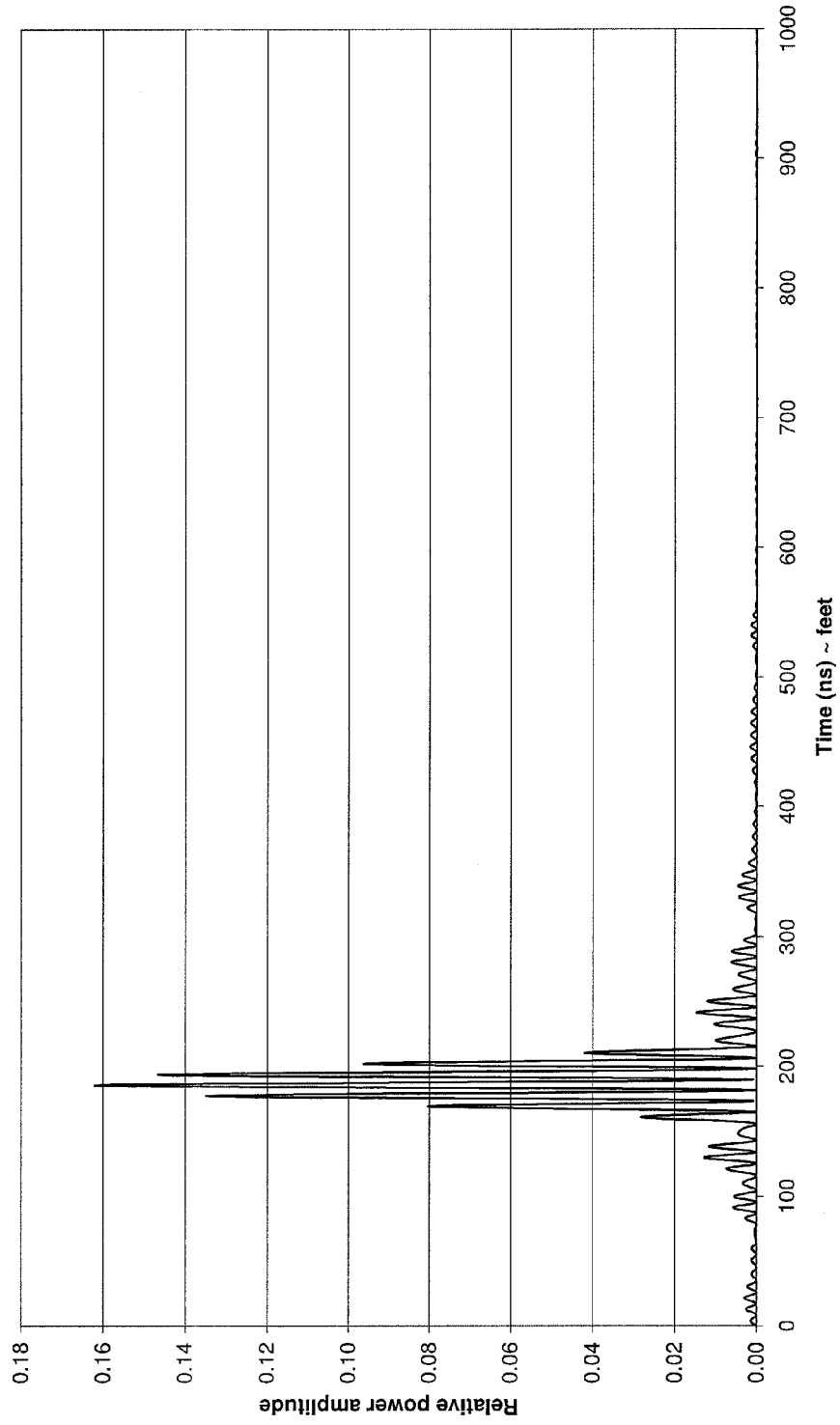
FIG. 9g is a plot of power of a differential compressed receive signal for a vehicle at 14 feet.

The approach of FIG. 7 results in consistent transmitted and received signals although the monostatic radar system has several limitations. Leakage of RF signals in Circulator 16 and unmodulated reflections from radar antenna 18 produce signals that are much higher than the modulated signals received from the tag 20, resulting in a diminished sensitivity. Sensitivity is improved by the bistatic system of FIG. 8 that eliminates circulator 16 of FIG. 7. Signals from the tag are received by antenna 21, amplified by amplifier 22, and down-converted by mixer 8. Data acquisition and processing may be accomplished as with the system of FIG. 7. The system of FIG. 8 decreases the signal levels of unmodulated signals not originating with the tag and allow amplification of the small received signals without resulting in signal compression. Noise in the system is also due to the quantization of time and amplitude by the analog to digital converters in the Control and Data Acquisition module 3. The bistatic architecture of FIG. 8 also helps decrease the unwanted effects in the A/D converters without resulting to converters operating at faster speeds and with higher resolution.

FIG. 9 shows the signals resulting for a vehicle 14 feet from the RFID and radar antennas. The bistatic differential pulse compression radar transmitted a chirp signal beginning at 902 MHz and ending at 928 MHz with a duration of 2 microseconds for each modulation state of the tag. A down-converted transmitted signal is shown in FIG. 9a. The down-converted received reflected signals are shown in FIG. 9b for the tag in modulation state A, and in FIG. 9c for the tag in modulation state B. The Fast Fourier Transform method of implementing a matched filter produces the compressed signals shown in FIG. 9d for the tag in modulation state A, and in FIG. 9e for the tag in modulation state B. The differential compressed signal from the tag is shown in FIG. 9f which is the subtraction of the signals of FIGS. 9b and 9c, thus removing constant reflections leaving the signal originating from the modulation produced by the tag. The power in the compressed signal from the tag is shown in FIG. 9g. The peak of the signal of FIG. 9g occurs at 185.5 nanoseconds. It is convenient to use the power of the compressed signal to identify the peak of the correlation since it is not know apriori which of the modulation states of the tag will produce higher signals (eg. should A-B or B-A be used? Either will eliminate the constant background leaving a signal produced by tag modulation). Alternately, the amplitude of the correlation signal may be used.

The long delay time is due to the delay resulting from the cables connecting the roadside radar system to the radar antennas. The system can be calibrated noting the delay time for a tag at a particular location. Then the delay for a tag at an unknown location can be compared with that for the known location. The difference in timing is then used to calculate the location of the tag with respect to the tag location corresponding to the known delay.

This example uses a chirp signal with a linear sweep and constant amplitude. The methods may also be used for other modulations including but not limited by CDMA, non-linear chirp, AM, FM, phase modulation, Barker codes, and other modulation codes.

Active Transmitter Tag RFID Systems

Active RFID tags transmit data to readers by generating and modulating RF signals sent to a reader. Various modulation waveforms and codes may be used. A common modulation is amplitude on/off keying using Manchester coding. The reader recovers the clock frequency and decodes the Manchester modulation to recover the data sent by the tag. The following approach may also be used with other forms of modulation and coding.

Tags are relatively simple and inexpensive devices. As such, an on/off keying may be accomplished by switching a source of RF signal within a tag on and off to a tag antenna. This switching changes the load impedance connected to the antenna, and thus may change the backscatter cross section of the tag antenna as the RF source is switched on and off. Thus, the methods of this invention may be used to measure the distance to RFID systems using active (transmitter) tags. The sensitivity of the radar system will be good because of the ability to use a super heterodyne receiver and pulse compression techniques. Thus, active transmitter tags may be designed to enhance the modulated backscatter cross section of the tag antenna, or the residual modulated backscatter cross section may used, either method may use the present invention to measure the distance to an active RFID tag in the presence of other RF signals, clutter, multipath and noise.

Those skilled in the art will recognize other detailed designs and methods that can be developed employing the teachings of the present invention. The examples provided here are illustrative and do not limit the scope of the invention, which is defined by the attached claims. For example, disclosure with respect to waveforms for encoding or representing data can apply equally well to the inverses of the waveforms used as examples.

What is claimed is:

1. A method for measuring distance between an RFID tag reader and an RFID tag, the RFID tag having a plurality of backscatter reflection states; the method mitigating detrimental effects of noise, clutter and multi-path signals, comprising the steps of:
   transmitting an RF signal to the tag;
   receiving a first backscattered RF return signal from the tag corresponding to a first backscatter reflection state of the tag;
   receiving a second backscattered RF return signal from the tag corresponding to a second backscatter reflection state of the tag;
   signaling by the tag reader to a pulse radar timing of said first and second backscatter reflection states;
   transmitting a first radar signal by said pulse radar during said first backscatter reflection state of the tag;
   transmitting a second radar signal by said pulse radar during said backscatter reflection state of the tag;
   receiving reflected return radar signals by said pulse radar from the tag during said first and second backscatter reflection states of the tag;
   processing each of said received reflected radar signals using a fast Fourier transform (FFT) to produce complex signal spectrums;
   forming a complex conjugate of the FFT of one of said transmitted radar signals;
   multiplying said complex conjugate of the transmit signal with the FFT of each received signal individually to create first and second products;
   producing a correlation for each received signal individually by performing an inverse FFT of each of said first and second products;
   subtracting the correlation obtained with the tag in said first backscatter reflection state from the correlation with the tag in said second backscatter reflection state to produce a signal having a peak;
   determining round trip time delay to the RFID tag from the time of said peak;
   calculating the distance between the RFID tag and the reader based on said round trip time delay.

2. The method of claim 1, wherein said calculating of distance is based on a plurality of said determined round trip time delays.

3. The method of claim 1, further comprising commanding all but one RFID tag to be silent.

4. The method of claim 1, wherein said first and second radar signals are chirp radar signals.

5. A system for measuring distance between an RFID tag reader and an RFID tag, the RFID tag having a plurality of backscatter reflection states; the system mitigating detrimental effects of noise, clutter and multi-path signals, the system comprising:
   an RFID tag reader comprising a transmitter configured to transmit an RF signal to the tag and to transmit a timing signal indicating backscatter reflection states of the tag;
   a pulse radar configured to receive said timing signal from said RFID tag reader indicating backscatter reflection states of the tag; to transmit a first radar signal during a first backscatter reflection state of the tag; to transmit a second radar signal during a second backscatter reflection state of the tag and
   to receive a first reflected radar signal from the tag during said first backscatter reflection state of the tag and a second reflected radar from the tag signal during said second backscatter reflection state of the tag;
   said pulse radar further configured to:
   compress said first and second received reflected radar signals using a signal compression process;
   the system further comprising a signal processor configured to:
   process each of said received reflected radar signals using a fast Fourier transform (FFT) to produce complex signal spectrums;
   form a complex conjugate of the FFT of one of said transmitted radar signals;
   multiply said complex conjugate of the transmit signal with the FFT of each received signal individually to create first and second products;
   produce a correlation for each received signal individually by performing an inverse FFT of each of said first and second products;
   subtract the correlation obtained with the tag in said first backscatter reflection state from the correlation with the tag in said second backscatter reflection state to produce a signal having a peak;
   determine a round trip time delay to the RFID tag from the time of said peak; and
   calculate the distance between the RFID tag and the reader based on said round trip time delay.

6. The system of claim 5, wherein said processor is further configured to calculate distance based on a plurality of said determined round trip time delays.

7. The system of claim 5 wherein said transmitter is further configured to command all but one RFID tag to be silent.

8. The system of claim 5, wherein said first and second radar signals are chirp radar signals.

* * * * *